(12) United States Patent
Jung et al.

(10) Patent No.: US 10,219,201 B2
(45) Date of Patent: Feb. 26, 2019

(54) DEVICE AND METHOD FOR DISCOVERING SMALL CELL IN WIRELESS COMMUNICATION SYSTEM

(71) Applicant: Samsung Electronics Co., Ltd, Gyeonggi-do (KR)

(72) Inventors: Jung-Soo Jung, Gyeonggi-do (KR); Hyun-Jeong Kang, Seoul (KR); Sang-Wook Kwon, Gyeonggi-do (KR); Jong-Hyung Kwun, Seoul (KR); Suk-Won Kim, Gyeonggi-do (KR); Sun-Heui Ryoo, Gyeonggi-do (KR); Bong-Jhin Shin, Gyeonggi-do (KR); Sung-Jin Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 15/100,289

(22) PCT Filed: Nov. 19, 2014

(86) PCT No.: PCT/KR2014/011096
§ 371 (c)(1),
(2) Date: May 27, 2016

(87) PCT Pub. No.: WO2015/080420
PCT Pub. Date: Jun. 4, 2015

(65) Prior Publication Data
US 2017/0006531 A1 Jan. 5, 2017

(30) Foreign Application Priority Data

Nov. 29, 2013 (KR) .......................... 10-2013-0147551
May 9, 2014 (KR) .......................... 10-2014-0055593

(51) Int. Cl.
*H04W 48/16* (2009.01)
*H04W 88/08* (2009.01)
(Continued)

(52) U.S. Cl.
CPC ............ *H04W 48/16* (2013.01); *H04W 40/24* (2013.01); *H04W 84/045* (2013.01); *H04W 88/02* (2013.01); *H04W 88/08* (2013.01)

(58) Field of Classification Search
CPC . H04W 40/244; H04W 40/24; H04W 40/246; H04W 48/00; H04W 48/06;
(Continued)

(56) References Cited

U.S. PATENT DOCUMENTS 8,843,139 B2 * 9/2014 Yu .......................... H04W 48/16
370/338
2012/0263145 A1 * 10/2012 Marinier ............... H04W 36/22
370/331
(Continued)

FOREIGN PATENT DOCUMENTS

WO  WO 2012/142436 A1  10/2012
WO  WO 2013/005105 A2  1/2013
WO  WO 2013/140243 A1  9/2013

OTHER PUBLICATIONS

International Search Report dated Feb. 5, 2015 in connection with International Application No. PCT/KR2014/011096; 5 pages.
(Continued)

*Primary Examiner* — Warner Wong

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The purpose of the present disclosure is to discover a small cell in a wireless communication system. An operation of a
(Continued)

terminal in the wireless communication system includes receiving a first signal for informing of existence of a small cell according to a first measurement period and attempting to detect the first signal and a second signal for informing of a service coverage of the small cell according to a second measurement period after detecting the first signal. In addition, the present disclosure also includes embodiments other than the embodiment described above.

20 Claims, 19 Drawing Sheets

(51) Int. Cl.
*H04W 88/02* (2009.01)
*H04W 40/24* (2009.01)
*H04W 84/04* (2009.01)

(58) Field of Classification Search
CPC ..... H04W 24/02; H04W 88/08; H04W 16/00; H04W 16/02
See application file for complete search history.

(56) References Cited

U.S. PATENT DOCUMENTS

| | | | |
|---|---|---|---|
| 2013/0079049 A1 | 3/2013 | Yu et al. | |
| 2014/0038598 A1* | 2/2014 | Ren | H04W 48/16 455/434 |
| 2015/0003287 A1* | 1/2015 | Kalhan | H04W 24/08 370/254 |
| 2015/0271738 A1* | 9/2015 | Cheng | H04W 16/24 455/422.1 |
| 2015/0271743 A1* | 9/2015 | Teng | H04W 48/16 455/452.1 |
| 2015/0282131 A1* | 10/2015 | Nagata | H04W 16/32 370/329 |
| 2015/0358890 A1* | 12/2015 | Xu | H04W 48/16 455/437 |
| 2016/0057664 A1* | 2/2016 | Ahn | H04J 11/0069 370/331 |
| 2016/0112937 A1* | 4/2016 | Nagasaka | H04W 48/16 455/434 |
| 2016/0174088 A1* | 6/2016 | Yilmaz | H04W 36/0088 455/434 |
| 2016/0198381 A1* | 7/2016 | Kim | H04W 52/02 370/331 |
| 2016/0278125 A1* | 9/2016 | Liao | H04W 24/00 |
| 2016/0295500 A1* | 10/2016 | Liu | H04W 48/16 |
| 2016/0345224 A1* | 11/2016 | Agyapong | H04W 36/0072 |
| 2017/0006532 A1* | 1/2017 | Wang | H04L 5/0048 |
| 2017/0135036 A1* | 5/2017 | Schmidt | H04W 52/0206 |
| 2017/0135039 A1* | 5/2017 | Takeda | H04W 52/0225 |
| 2017/0311180 A1* | 10/2017 | Jalden | H04W 16/28 |
| 2018/0270644 A1* | 9/2018 | Koorapaty | H04W 8/005 |

OTHER PUBLICATIONS

Written Opinion of the International Searching Authority dated Feb. 5, 2015 in connection with International Application No. PCT/KR2014/011096; 4 pages.

Notice of Patent Grant for Korean Patent Application No. 10-2014-0055593 dated Jun. 11, 2018; 5 pages.

* cited by examiner

DEVICE AND METHOD FOR DISCOVERING SMALL CELL IN WIRELESS COMMUNICATION SYSTEM

CROSS-REFERENCE TO RELATED APPLICATION(S) AND CLAIM OF PRIORITY

The present application claims priority under 35 U.S.C. § 365 to International Patent Application No. PCT/KR2014/011096 filed Nov. 19, 2014, entitled "DEVICE AND METHOD FOR DISCOVERING SMALL CELL IN WIRELESS COMMUNICATION SYSTEM", and, through International Patent Application No. PCT/KR2014/011096, to Korean Patent Application No. 10-2013-0147551 filed Nov. 29, 2013, and to Korean Patent Application No. 10-2014-0055593 filed May 9, 2014, each of which are incorporated herein by reference into the present disclosure as if fully set forth herein.

TECHNICAL FIELD

The present disclosure relates to discovery of a small cell in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

That is, a wireless communication system is developing rapidly and, particularly, is recently developing in a form capable of supporting a high-speed large capacity data service in order to satisfy user's various desires. As one way for the high-speed large capacity data service, installing a small cell as well as an existing macro cell is being taken into consideration.

Generally, the small cell has a narrow coverage and therefore, can support a data rate higher than a data rate that the macro cell services by a closer distance with a terminal. Accordingly, in case where it is difficult to communicate with the existing macro cell, effective network management is possible using the small cell supporting the high data rate. That is, the small cell is used in a shadow area of the macro cell or an area of a great traffic demand, thereby being capable of making contribution to the effective network management.

To connect to the small cell, a terminal first has to discover the small cell. That is, because the small cell has a narrower coverage than the macro cell, there is a high possibility in which the terminal first connects to the macro cell. Accordingly, the terminal that is connecting to the macro cell can do handover to the small cell after discovering the small cell. Accordingly, a procedure and technique for more efficiently discovering the small cell is demanded.

SUMMARY

One exemplary embodiment of the present disclosure provides an apparatus and method for discovering a small cell in a wireless communication system.

Another exemplary embodiment of the present disclosure provides an apparatus and method for transmitting a signal for small cell discovery in a wireless communication system.

A further exemplary embodiment of the present disclosure provides an apparatus and method for controlling a measurement period for small cell discovery of a terminal in a wireless communication system.

An operation method of a terminal in a wireless communication system according to an exemplary embodiment of the present disclosure is including receiving a first signal informing existence of a small cell in accordance with a first measurement period and, after detecting the first signal, attempting detection of the first signal and a second signal informing a service coverage of the small cell in accordance with a second measurement period.

An operation method of a small cell base station in a wireless communication system according to another exemplary embodiment of the present disclosure is including transmitting a first signal for informing existence of the small cell by periods, and transmitting a second signal for informing a service coverage of the small cell.

A terminal apparatus in a wireless communication system according to a further exemplary embodiment of the present disclosure is including a transceiving unit receiving a first signal informing existence of a small cell in accordance with a first measurement period, and a control unit attempting detection of the first signal and a second signal informing a service coverage of the small cell in accordance with a second measurement period.

A small cell base station apparatus in a wireless communication system according to a yet another exemplary embodiment of the present disclosure is including a transmission unit transmitting a signal through a wireless channel, and a control unit controlling to transmit a first signal for informing existence of the small cell by periods, and transmit a second signal for informing a service coverage of the small cell.

By configuring a signal for small cell discovery by two signals and transmitting such that the two signals have coverage different from each other in a wireless communication system, a measurement operation of a terminal can be optimized.

DETAILED DESCRIPTION

The operation principle of the present disclosure is described below with reference to the accompanying drawings. In describing the present disclosure below, a detailed description of related well-known functions or constructions will be omitted in case where it is determined that a concrete description thereof could unnecessarily obscure the gist of the disclosure. And, the terms described later, terms defined considering functions in the present disclosure, can be modified in accordance to user, operator's intention or practice, etc. Therefore, the definition should be given based on the content throughout the present specification.

Below, the present disclosure describes a technology for discovering a small cell in a wireless communication system. In the following description, the 'small cell' may be used together with a wording of denoting a small cell base station providing a small cell and coverage provided by the small cell base station. Further, the terms expressing a cell, a frame structure, a channel, a signal, etc. used in the following description are for description convenience. Accordingly, the disclosure is not limited to the terms described later, and other terms denoting an object having an equivalent technological meaning may be used.

FIGS. 1A-1D illustrates examples of relationships between a macro cell and a small cell in a wireless communication system according to an exemplary embodiment of the present disclosure.

Referring to FIGS. 1A-1D, the exemplification of four arrangements of the macro cell 110 and the small cell cluster 120 is introduced. The small cell cluster 120 means a group of a plurality of small cells. The four arrangements exemplified in the FIG. 1 are divided according to an operating frequency and indoor/outdoor or not.

Figure 1A:
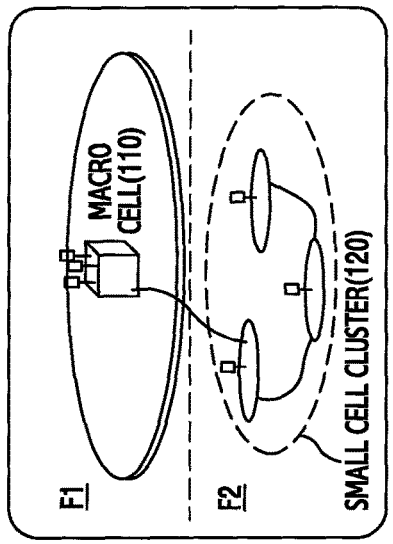
FIGS. 1A-1D illustrate examples of relationships between a macro cell and a small cell in a wireless communication system according to an exemplary embodiment of the present disclosure.

Referring to FIG. 1A, the macro cell 110 and the small cell cluster 120 may operate at the same frequency f1. At this time, the small cell cluster 120 is installed outdoor. In this case, the macro cell 110 and the small cell cluster 120 may have interference on each other. However, in case where a terminal intends to discover a small cell, the terminal may measure at a frequency that is in communication with the macro cell 110.

Figure 1B:
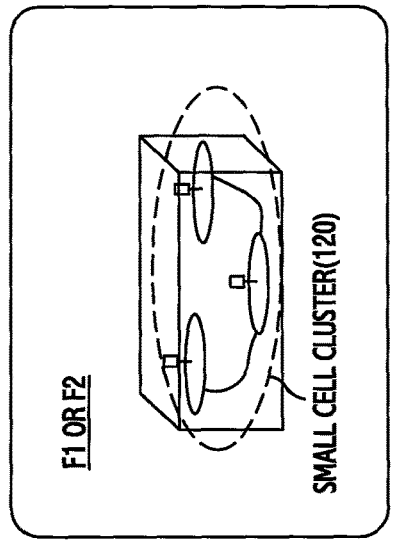

Referring to FIG. 1B, the macro cell 110 may operate at a frequency f1, and the small cell cluster 120 at a frequency f2. At this time, the small cell cluster 120 is installed outdoor. In this case, the macro cell 110 and the small cell cluster 120 do not have interference on each other. In case where a terminal intends to discover a small cell, the terminal may measure after changing an operation frequency.

Figure 1C:
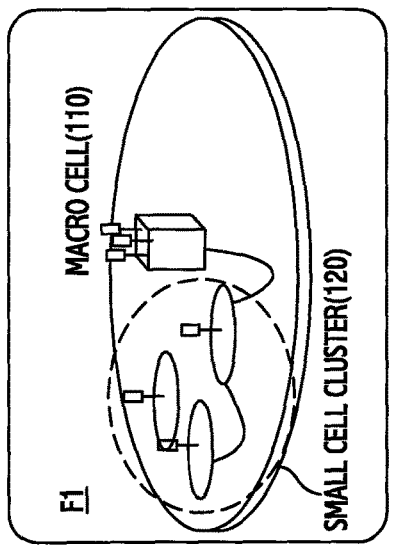

Referring to FIG. 1C, the macro cell 110 may operate at a frequency f1, and the small cell cluster 120 may operate at a frequency f2. At this time, the small cell cluster 120 is installed indoor. That is, the small cell cluster 120 covers an indoor shadow area. Because the frequencies at which the macro cell 110 and the small cell cluster 120 operate are different, in case where a terminal intends to discover a small cell, the terminal may measure after changing an operation frequency.

Figure 1D:
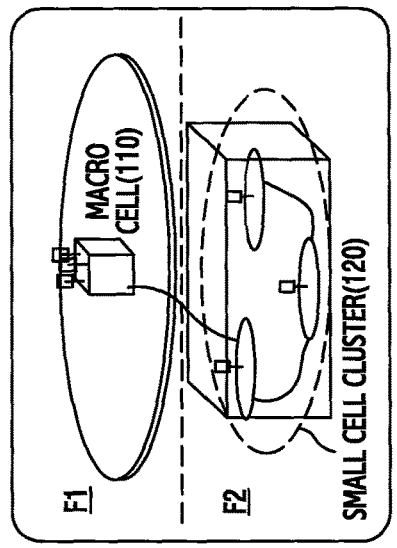

Referring to FIG. 1D, the macro cell 110 and the small cell cluster 120 may operate at the same frequency f1 or f2. At this time, the small cell cluster 120 is installed indoor. That is, the small cell cluster 120 covers an indoor shadow area. Because the frequencies at which the macro cell 110 and the small cell cluster 120 operate are the same, in case where a terminal intends to discover a small cell, the terminal may measure at a frequency that is in communication with the macro cell 110.

Figure 2:
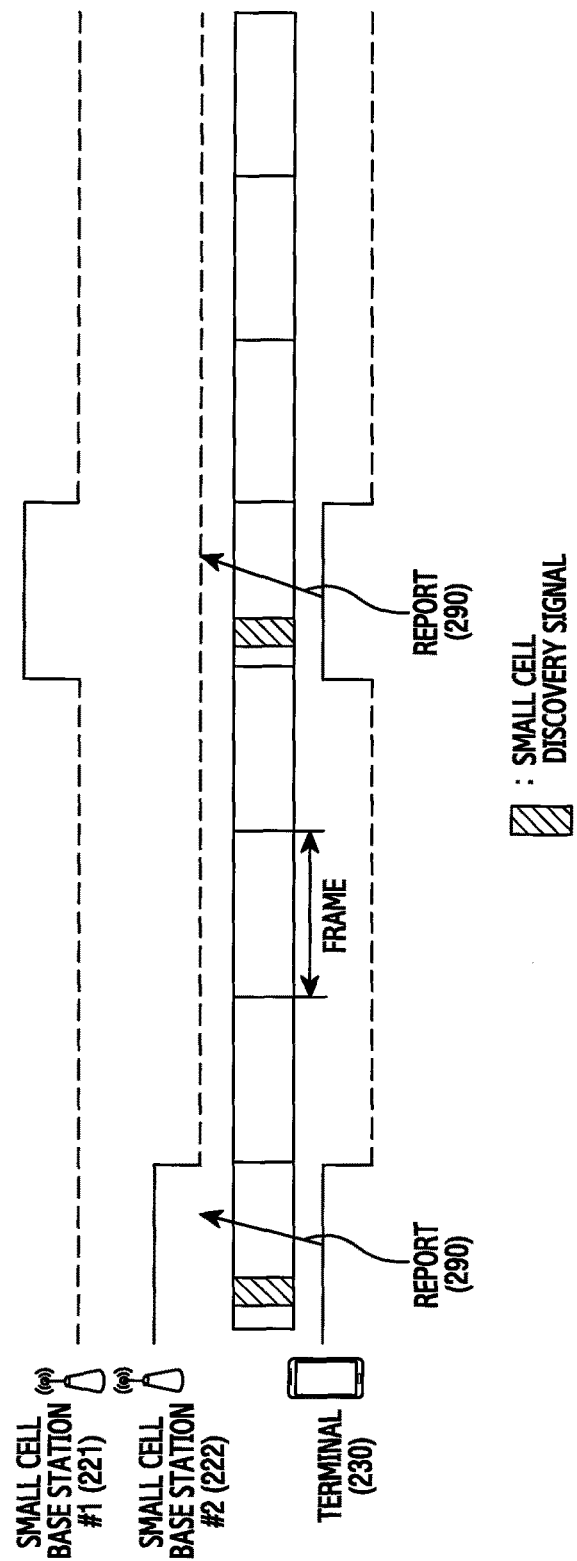
FIG. 2 illustrates signal transmission for small cell discovery in a wireless communication system according to an exemplary embodiment of the present disclosure.

FIG. 2 illustrates signal transmission for small cell discovery in a wireless communication system according to an exemplary embodiment of the present disclosure. The FIG.

2 exemplifies transmitting signals for small cell discovery in small cell base stations 221, 222.

Referring to the FIG. 2, the small cell base station#1 221 and the small cell base station #2 222 transmit small cell discovery signals by periods. A channel forwarding the small cell discovery signal may be named a 'discovery channel'. At this time, the small cell base station#1 221 and the small cell base station#2 222 perform cooperative muting. That is, when the small cell base station#1 221 transmits the small cell discovery signal, the small cell base station#2 222 transmits no signal during the discovery channel duration, for a transmission resource within the duration. In contrast, when the small cell base station#2 222 transmits the small cell discovery signal, the small cell base station#1 221 transmits no signal during the discovery channel duration, for a transmission resource within the duration. For this, frame synchronization between the small cell base station#1 221 and the small cell base station#2 222 may be needed. Accordingly to this, the small cell discovery signal is transmitted without interference by another signal, and may provide a wider coverage than another signal (e.g., a data signal) in which interference exists.

A terminal 230 attempts the detection and measurement of the small cell discovery signal in accordance with scheduling information about the small cell discovery signal transmission of the small cell base station#1 221 and the small cell base station#2 222. The scheduling information may be provided to the terminal 230 in various schemes. For example, the scheduling information may be provided from a macro base station to the terminal 230. In case where successfully detecting the small cell discovery signal, the terminal transmits a report 290 to a macro cell.

In the case of the exemplary embodiment illustrated in the FIG. 2, the base station#1 221 and the base station#2 222 transmit the discovery signals in frames different from each other, in other words, time points different from each other. But, in accordance with another exemplary embodiment of the present disclosure, the base station#1 221 and the base station#2 222 may transmit the discovery signals in the same frame, in other words, the same time point. In case where the discovery signal transmission time points of the base station#1 221 and the base station#2 222 are the same, resources for the discovery signal transmission of the base station#1 221 and the base station#2 222 may be allocated exclusively, in other words, to time-frequency domains different from each other.

Figure 3:
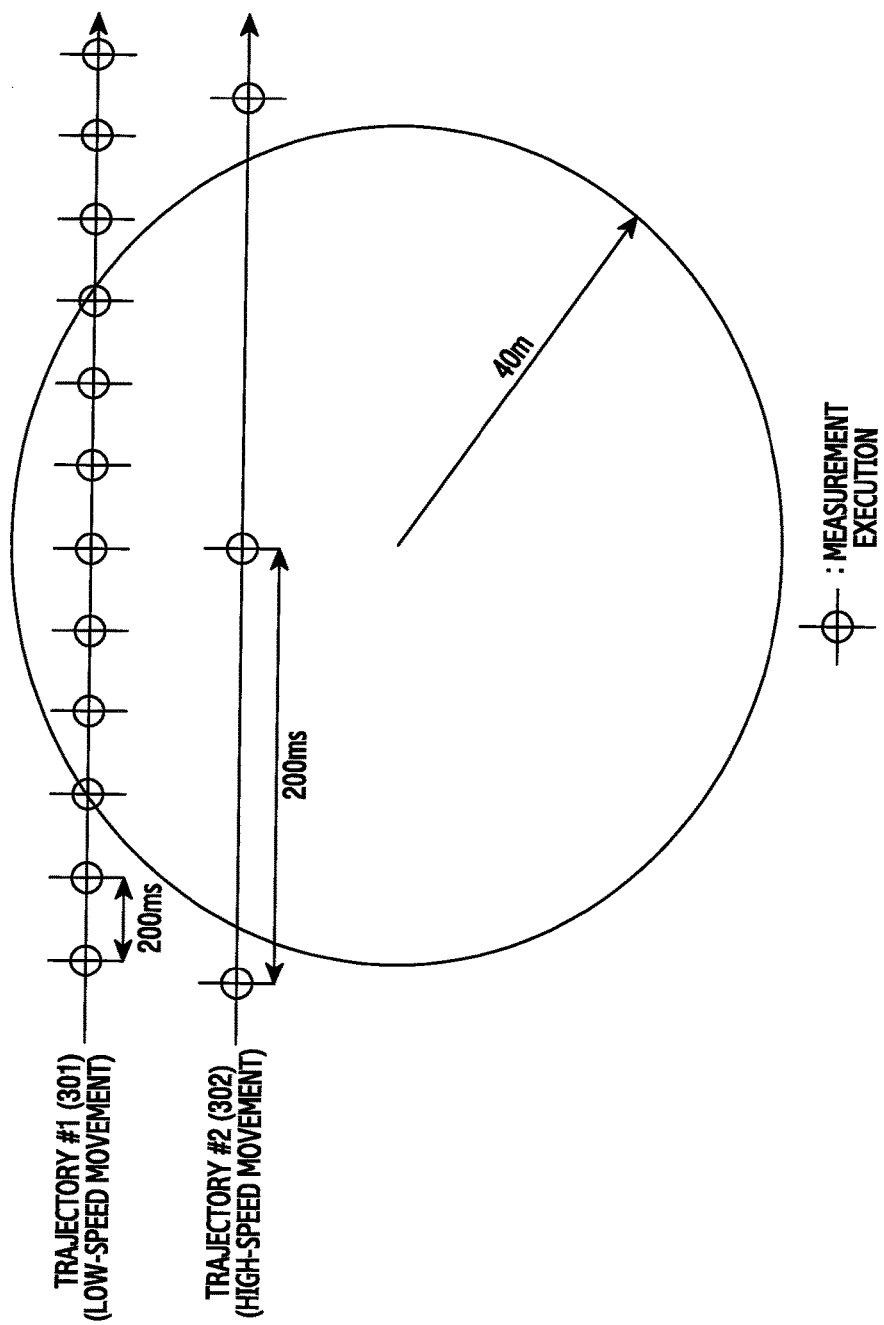
FIG. 3 illustrates an example of a measurement operation for small cell discovery in a wireless communication system according to an exemplary embodiment of the present disclosure.

FIG. 3 illustrates an example of a measurement operation for small cell discovery in a wireless communication system according to an exemplary embodiment of the present disclosure. The FIG. 3 exemplifies movement trajectories of a terminal.

Referring to the FIG. 3, a trajectory#1 301 and a trajectory#2 302 are trajectories passing through a cell, and the trajectory#1 301 is a low-speed movement and the trajectory#2 302 is a high-speed movement. A case where an attempt of the detection of the small cell discovery signal is periodically performed in accordance with a time interval of 200 ms is exemplified. In this case, following the trajectory#1 301, 12-times measurements are performed. Also, following the trajectory#2 302, 3-times measurements are performed. At this time, a case where the small cell discovery signal is successfully detected by locating within the cell at a measurement time point is seven times on the trajectory#1 301, one time on the trajectory#2 302.

The number of times at which the detection of the small cell discovery signal by a moving terminal is carried out is related with the coverage of a discovery channel. For example, the wider the coverage of the discovery channel, the number of times at which the detection of the small cell discovery signal is carried out may increase. Because the frequent execution of a detection operation causes fast power consumption, there may be a need to decrease the number of times of detection. For this, a way of increasing a transmission period of the small cell discovery signal, or relatively less frequently performing measurement in a terminal, etc. may be taken into consideration. But, in this case, the performance of discovery and measurement of a small cell may be degenerated. Accordingly, the present disclosure more proposes a structure of a discovery channel such as FIG. 4 below.

Figure 4:
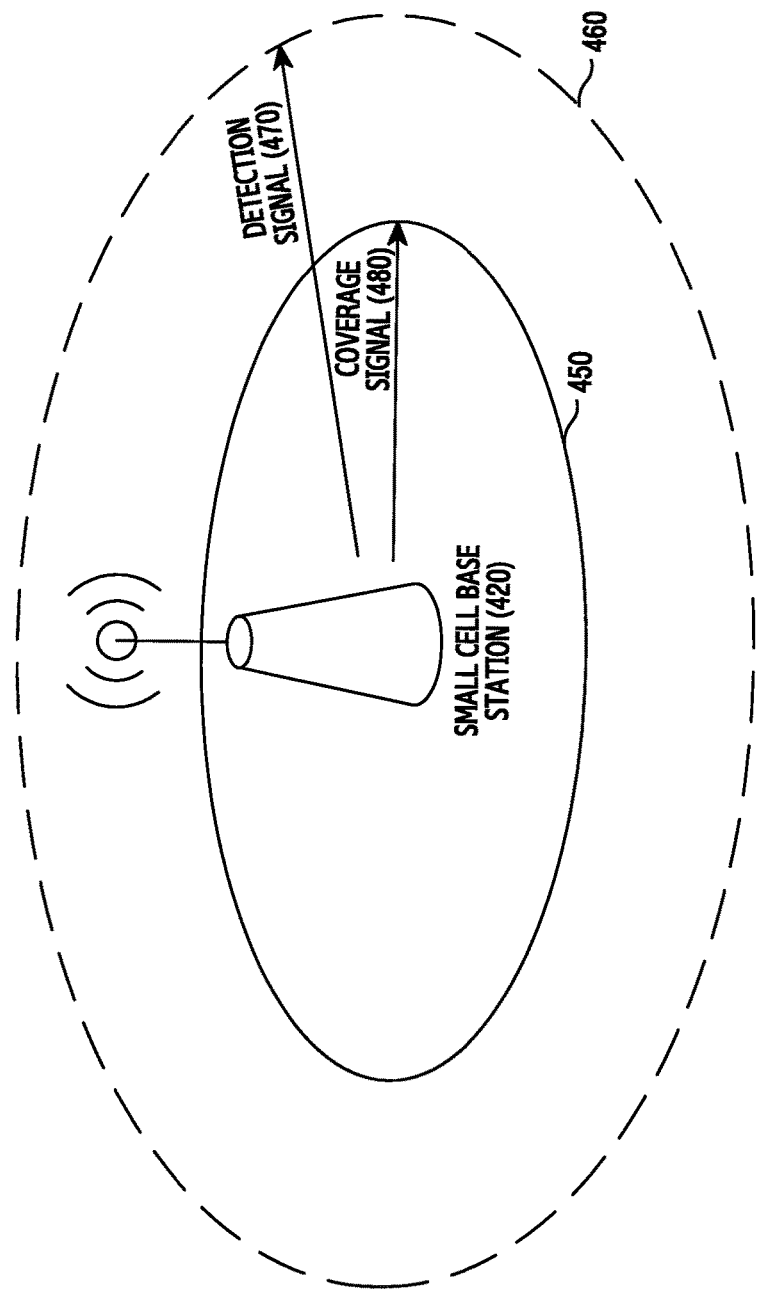
FIG. 4 illustrates the coverage of a discovery signal in a wireless communication system according to an exemplary embodiment of the present disclosure.

FIG. 4 illustrates the coverage of a discovery signal in a wireless communication system according to an exemplary embodiment of the present disclosure. The coverage illustrated in the FIG. 4 may be defined based on a reception strength of the discovery signal or a SINR (Signal to Interference and Noise Ratio) of the discovery signal, etc.

Referring to the FIG. 4, a discovery signal of a small cell base station 420 has two coverage 450, 460. That is, the discovery signal includes at least two signals. In detail, the discovery signal includes a first signal for informing the existence of the small cell base station 420, and a second signal for informing the data-communication available service coverage of the small cell base station 420 or a signal to interference and noise ratio (SINR) corresponding to the coverage. Below, for description convenience, the first signal is named a 'detection signal 470', and the second signal a 'coverage signal 480'.

In accordance with an exemplary embodiment of the present disclosure, the coverage 460 of the detection signal 470 is designed and used to be relatively wider than the coverage 450 of the coverage signal 480. For example, the coverage signal 480 is used such that all adjacent small cells transmit together, and the detection signal 470 may be used such that some small cells transmit. A terminal may independently detect the detection signal 470 and the coverage signal 480. Accordingly to this, the terminal may first recognize the existence of the small cell base station 420 through the detection signal 470, and determine if it is possible to communicate with the small cell base station 420 through the signal to interference and noise ratio (SINR) of the coverage signal 480. Here, the signal to interference and noise ratio may be replaced with another metric indicating a channel quality. For example, the signal to interference and noise ratio includes an SNR (Signal to Noise Ratio), a CINR (Carrier to Interference and Noise Ratio), etc. Also, the channel quality may be a combination of two or more of the signal to interference and noise ratio, the signal to noise ratio, the carrier to interference and noise ratio.

The detection signal 470 and the coverage signal 480 may be configured by a predefined sequence such as a synchronization signal. Or, the detection signal 470 and the coverage signal 480 may be configured to occupy some tones of an OFDM (Orthogonal Frequency Division Multiplexing) symbol such as a reference signal and be transmitted together with data symbols. For another example, one of the detection signal 470 and the coverage signal 480 may be configured like the synchronization signal, and the other one may be configured like the reference signal. The detection signal 470 and the coverage signal 480 may include identification information of the small cell base station 420, operation state (e.g., active/dormant state or not) information. Besides this, the detection signal 470 and the coverage signal 480 may further include information necessary for communication with the small cell base station 420. A concrete construction example of the detection signal 470 and the coverage signal 480 is given as in FIG. 5 below to FIG. 8 below.

Figure 5:
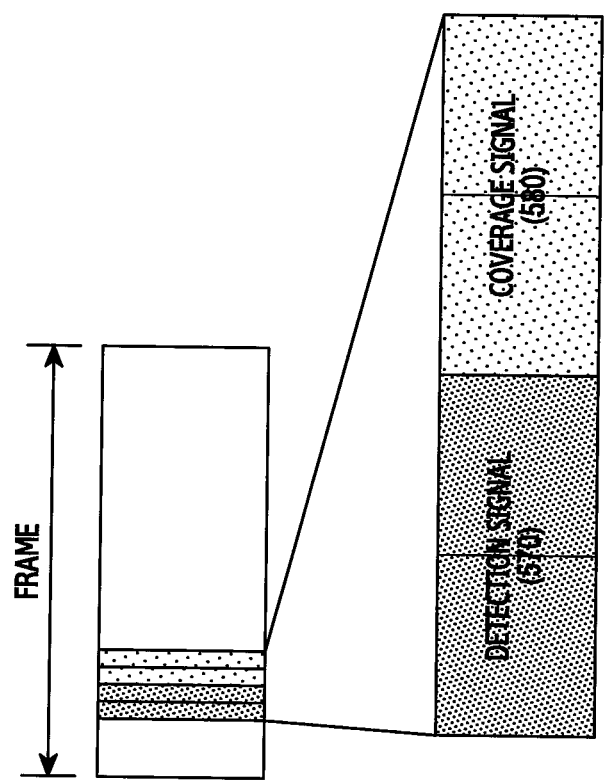
FIG. 5 illustrates a construction example of a discovery channel in a wireless communication system according to an exemplary embodiment of the present disclosure.

FIG. 5 illustrates a construction example of a discovery channel in a wireless communication system according to an exemplary embodiment of the present disclosure. Referring to the FIG. 5, a detection signal 570 and a coverage signal 580 are transmitted within one frame or subframe. In the FIG. 5, the detection signal 570 and the coverage signal 580 are multiplexed at a time axis. In other words, in the case of the FIG. 5, a region for the detection signal 570 and a region for the coverage signal 580 are defined in time resources different from each other of the same frame or subframe. But, in accordance with another exemplary embodiment of the present disclosure, the detection signal 570 and the coverage signal 580 may be multiplexed at a frequency axis. Or, the detection signal 570 and the coverage signal 580 may be multiplexed in a different scheme.

Figure 6:
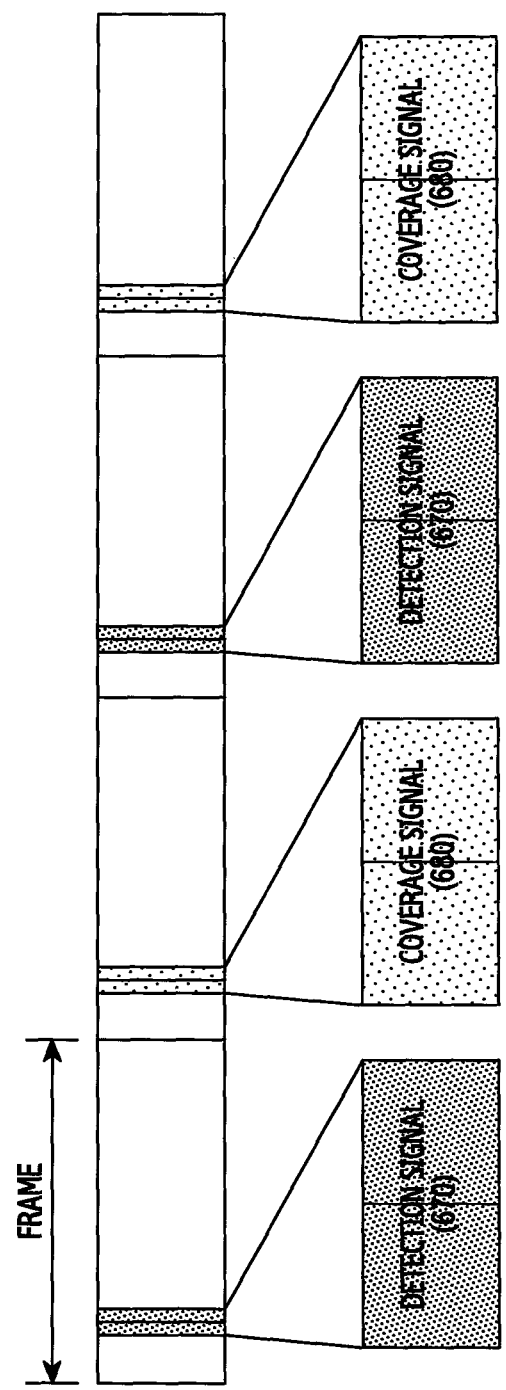
FIG. 6 illustrates another construction example of a discovery channel in a wireless communication system according to an exemplary embodiment of the present disclosure.

FIG. 6 illustrates another construction example of a discovery channel in a wireless communication system according to an exemplary embodiment of the present disclosure. Referring to the FIG. 6, a detection signal 670 is transmitted in a partial frame or partial subframe, and a coverage signal 680 in the remaining frame or remaining subframe. In other words, in the case of the FIG. 6, each frame or each subframe includes one of a region for the detection signal 670 and the coverage signal 680.

Figure 7:
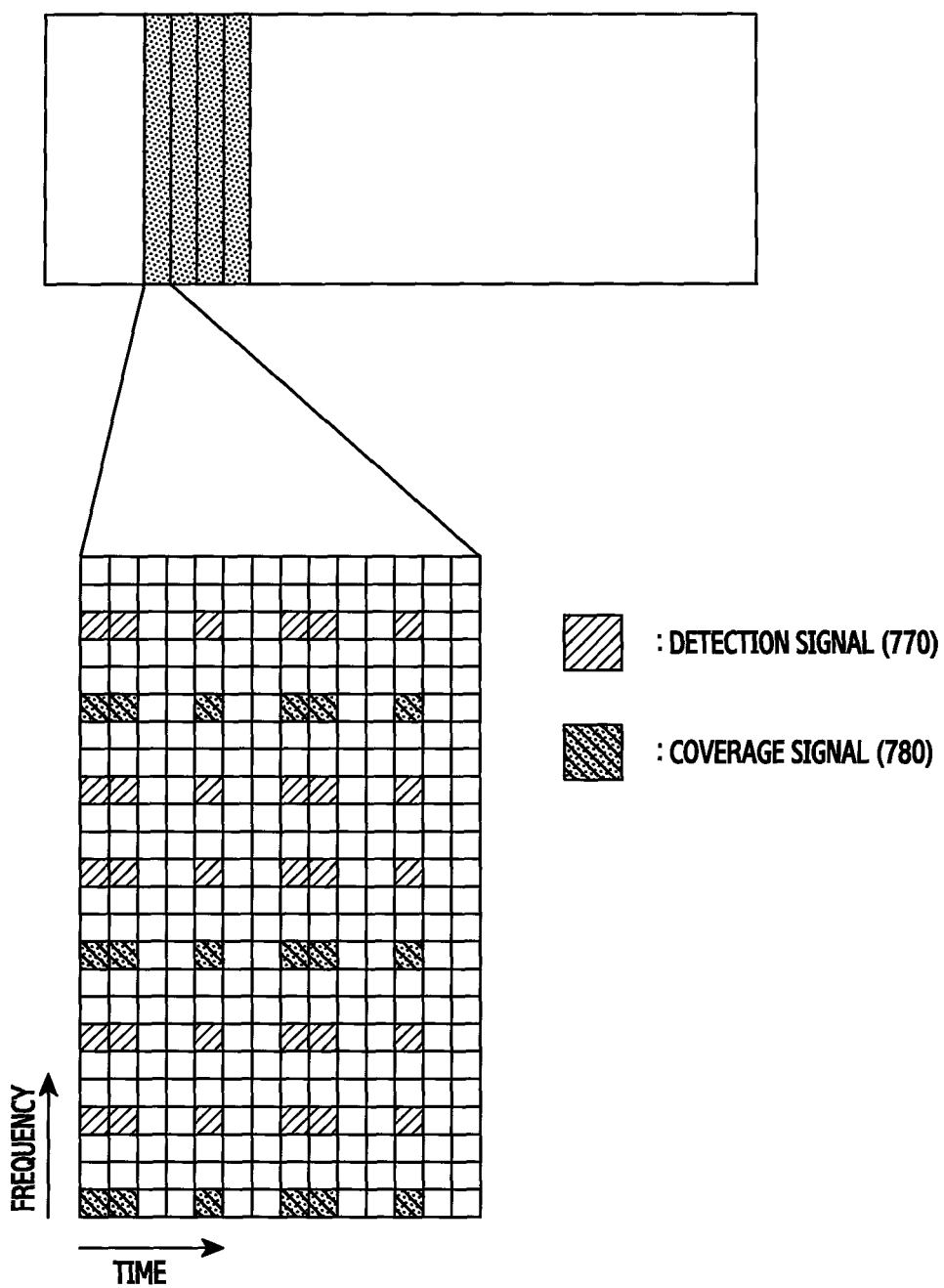
FIG. 7 illustrates a further construction example of a discovery channel in a wireless communication system according to an exemplary embodiment of the present disclosure.

FIG. 7 illustrates a further construction example of a discovery channel in a wireless communication system according to an exemplary embodiment of the present disclosure. The FIG. 7 exemplifies a case where a detection signal 770 and a coverage signal 780 are configured like a reference signal. Referring to the FIG. 7, the detection signal 770 and the coverage signal 780 are multiplexed at a frequency axis. That is, the detection signal 770 and the coverage signal 780 are mapped to some symbols among symbols within a slot, and the detection signal 770 is mapped to some subcarriers, and the coverage signal 780 to the remaining subcarriers.

Figure 8:
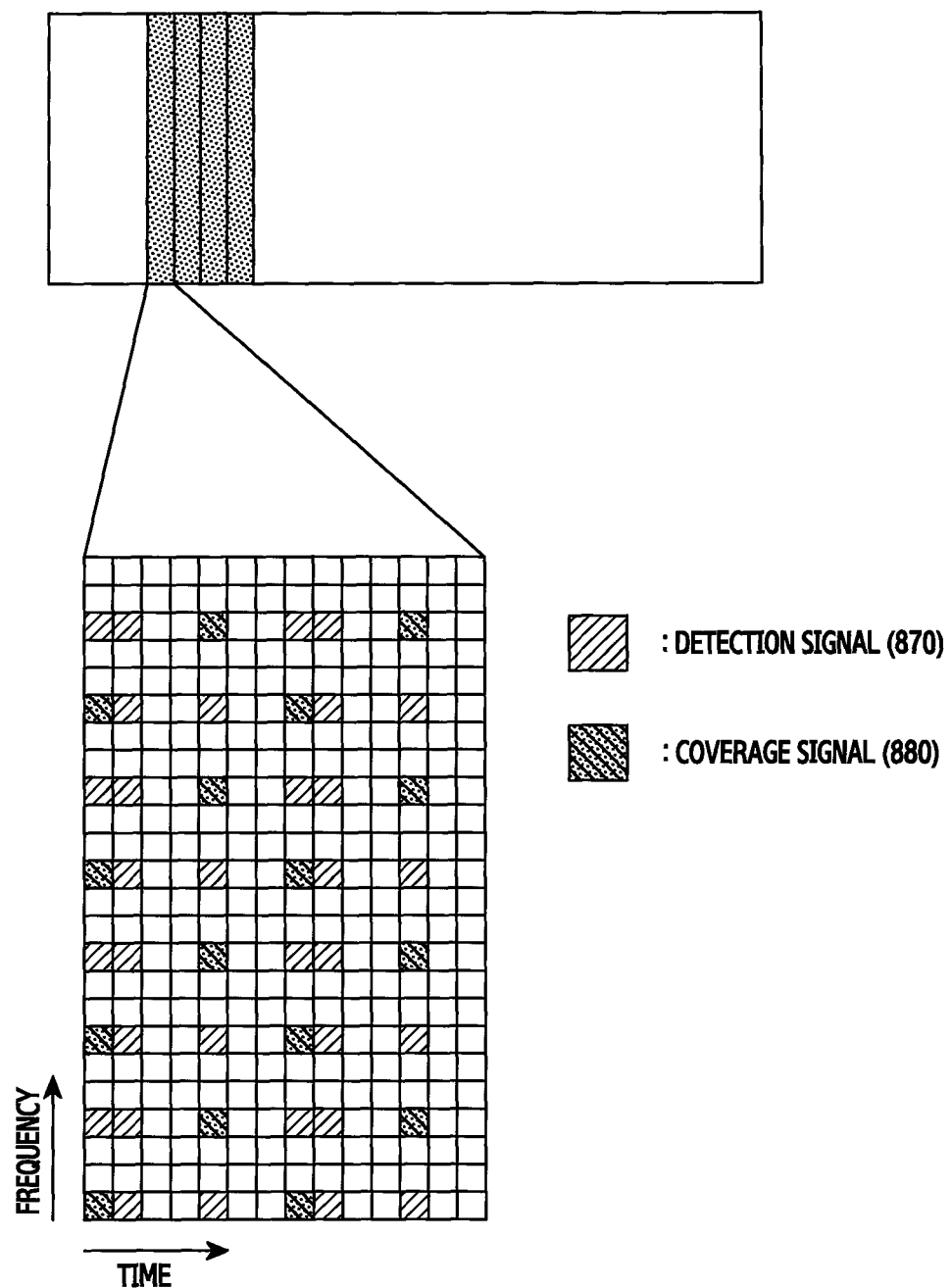
FIG. 8 illustrates a yet another construction example of a discovery channel in a wireless communication system according to an exemplary embodiment of the present disclosure.

FIG. 8 illustrates a yet another construction example of a discovery channel in a wireless communication system according to an exemplary embodiment of the present disclosure. The FIG. 8 exemplifies a case where a detection signal 870 and a coverage signal 880 are configured like a reference signal. Referring to the FIG. 8, the detection signal 870 and the coverage signal 880 are multiplexed on a basis of an antenna port. That is, the detection signal 870 is mapped to tones for a specific antenna, and the coverage signal 880 to tones for another antenna.

The use of a discovery channel according to an exemplary embodiment of the present disclosure may be divided in accordance with an operation state of a small cell. The operation state of the small cell may be divided into an active state and a dormant state. The activate state, a situation in which at least one terminal is connected to a small cell, means a state in which the small cell performs communication. The dormant state, a situation in which a terminal connected to the small cell does not exist, means a state in which the small cell does not perform communication. Despite the dormant state, a corresponding small cell may transmit some of signals transmitted in the active state.

A small cell transmits the detection signal irrespectively of an operation state, but may vary the transmission of the coverage signal in accordance with the operation state. Because the detection signal is for informing the existence or non-existence of a corresponding small cell, there may be a need to be transmitted irrespectively of the operation state. But, it is advantageous for accurate coverage detection that the coverage signal is transmitted in the active state, because the communication-available coverage of a small cell or a signal to interference and noise ratio (SINR) corresponding to the coverage is actually dependent on a communication state. However, because the operation state of the small cell may be changed, even the small cell being in the dormant state may transmit the coverage signal in a partial discovery channel. For example, in the case of the active state, the small cell may transmit the detection signal in accordance with a predefined period, and transmit the coverage signal in the coverage signal regions of all discovery channels. In contrast, in the case of the dormant state, the small cell may transmit the detection signal in accordance with the predefined period, and transmit the coverage signal together at the detection signal transmission. Concrete use examples of the discovery channel are described with reference to FIG. 9 below.

Figure 9:
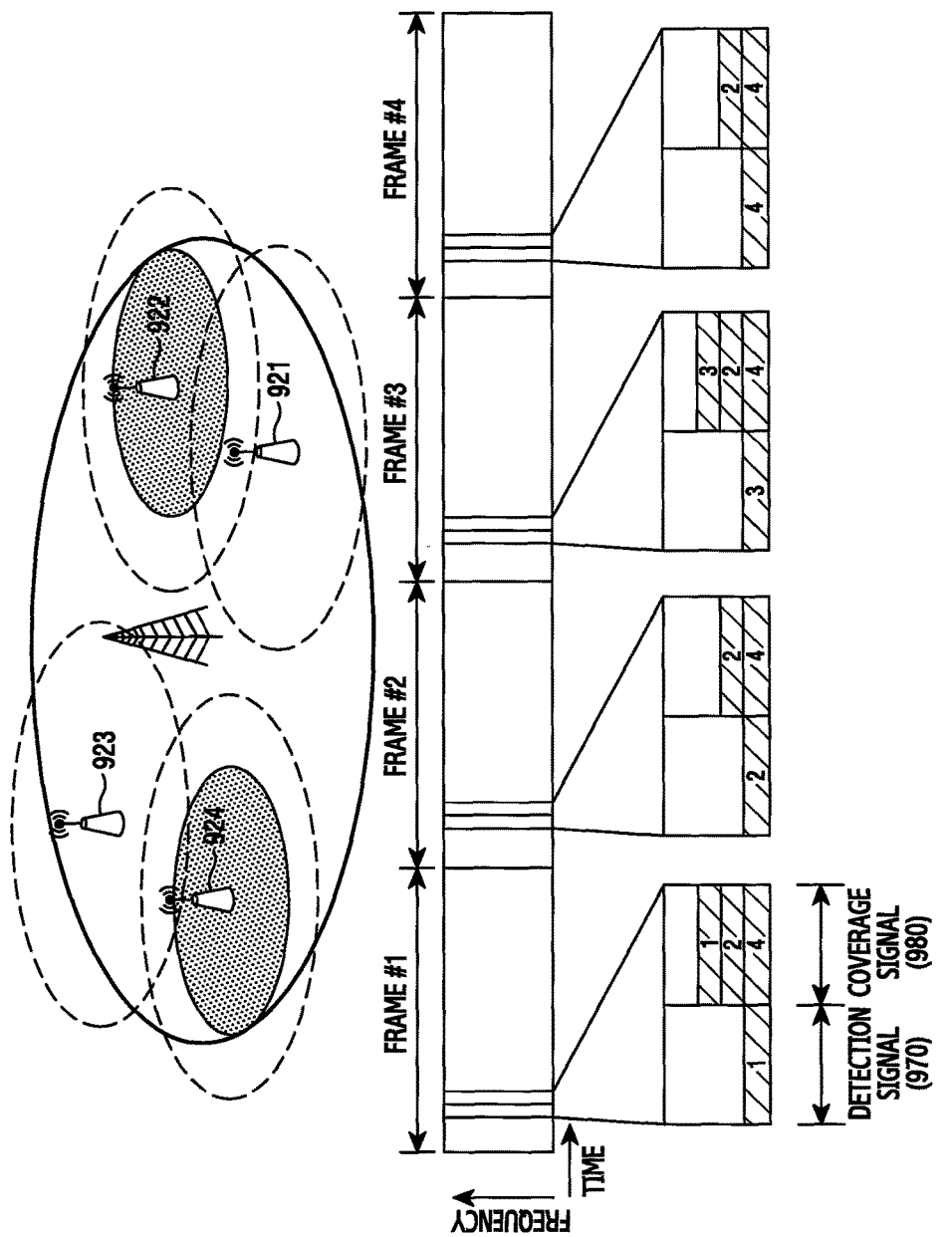
FIG. 9 illustrates a use example of a discovery channel in a wireless communication system according to an exemplary embodiment of the present disclosure.

FIG. 9 illustrates a use example of a discovery channel in a wireless communication system according to an exemplary embodiment of the present disclosure. The FIG. 9 is a situation in which four small cells 921 to 924 are located adjacently, and exemplifies a case where a small cell base station#2 922 and a small cell base station#4 924 are in an active state, and a small cell base station#1 921 and a small cell base station#3 923 are in a dormant state. In the FIG. 9, a solid line represents the coverage of a coverage signal 980, and a dotted line the coverage of a detection signal 970.

Referring to the FIG. 9, in a frame#1, the small cell base station#1 921 transmits a detection signal 970. And, in the frame#1, the small cell base station#1 921, the small cell base station#2 922, and the small cell base station#4 924 transmit coverage signals 980. The small cell base station#2 922 and the small cell base station#4 924 are in the active state and therefore, transmit the coverage signals 980. The small cell base station#1 921 is in the dormant state but a transmission period of the detection signal 970 has arrived and therefore, it transmits the coverage signal 980 together with the detection signal 970.

In a frame#2, the small cell base station#2 922 transmits a detection signal 970. And, in the frame#2, the small cell base station#2 922 and the small cell base station#4 924 transmit coverage signals 980. The small cell base station#2 922 and the small cell base station#4 924 are in the active state and therefore, transmit the coverage signals 980.

In a frame#3, the small cell base station#3 923 transmits a detection signal 970. And, in the frame#3, the small cell base station#2 922, the small cell base station#3 923, and the small cell base station#4 924 transmit coverage signals 980. The small cell base station#2 922 and the small cell base station#4 924 are in the active state and therefore, transmit the coverage signals 980. The small cell base station#3 923 is in the dormant state but a transmission period of the detection signal 970 has arrived and therefore, it transmits the coverage signal 980 together with the detection signal 970.

In a frame#4, the small cell base station#4 924 transmits a detection signal 970. And, in the frame#4, the small cell base station#2 922 and the small cell base station#4 924 transmit coverage signals 980. The small cell base station#2 922 and the small cell base station#4 924 are in the active state and therefore, transmit the coverage signals 980.

In the exemplary embodiment illustrated in the FIG. 9, the detection signal 970 and the coverage signal 980 are multiplexed within one frame. But, in accordance with another exemplary embodiment of the present disclosure, the detection signal 970 and the coverage signal 980 may be multiplexed on a basis of a frame or subframe. In this case, a frame forwarding the detection signal 970 and a frame forwarding the coverage signal 980 may be tied as one pair, and be used similarly with a scheme such as the FIG. 9.

In the exemplary embodiment illustrated in the FIG. 9, the detection signal 970 and the coverage signal 980 are multiplexed at a time axis. But, in accordance with another exemplary embodiment of the present disclosure, the detection signal 970 and the coverage signal 980 may be multiplexed at a frequency axis, or be multiplexed at a domain of another resource not the time axis or the frequency axis.

In the case of the exemplary embodiment illustrated in the FIG. 9, the base stations 921 to 924 each transmit the discovery signals in frames different from one another, in other words, time points different from one another. But, in accordance with another exemplary embodiment of the present disclosure, the base stations 921 to 924 may transmit the discovery signals in the same frame, in other words, at the same time point. In case where the discovery signal transmission time points of the base stations 921 to 924 are the same, resources for discovery signal transmission of the base stations 921 to 924 may be allocated exclusively, in other words, to time-frequency domains different from each other.

In the aforementioned exemplary embodiment, the coverage signal is transmitted to inform the communication available coverage of a corresponding small cell. Accordingly, in accordance with an exemplary embodiment of the present disclosure, the small cell may inform a load level through the coverage signal. The load indicates a rate of a resource being in use and, for example, may be expressed by at least one of the number of connected terminals, a rate of total available resource to resource being in use.

For example, the small cell partially punctures tones of a coverage signal, thereby being capable of informing a load degree. For example, the lower the load level, the more the number of punctured tones is. In other words, the higher the load level, tones of a greater number may be configured for the coverage signal. That is, the higher the load level, the more it may have interference on an adjacent cell and therefore, the number of punctured tones may be controlled such that interference by the coverage signal reflects interference at data transmission.

In a concrete example, in case where the load level is equal to or is greater than 80%, available all tones may be configured for the coverage signal. In case where the load level is 30% to 80%, 50% of available all tones are punctured, and the remaining 50% may be configured for the coverage signal. In case where the load level is less than 30%, 70% of available all tones are punctured, and the remaining 30% may be configured for the coverage signal.

Figure 10:
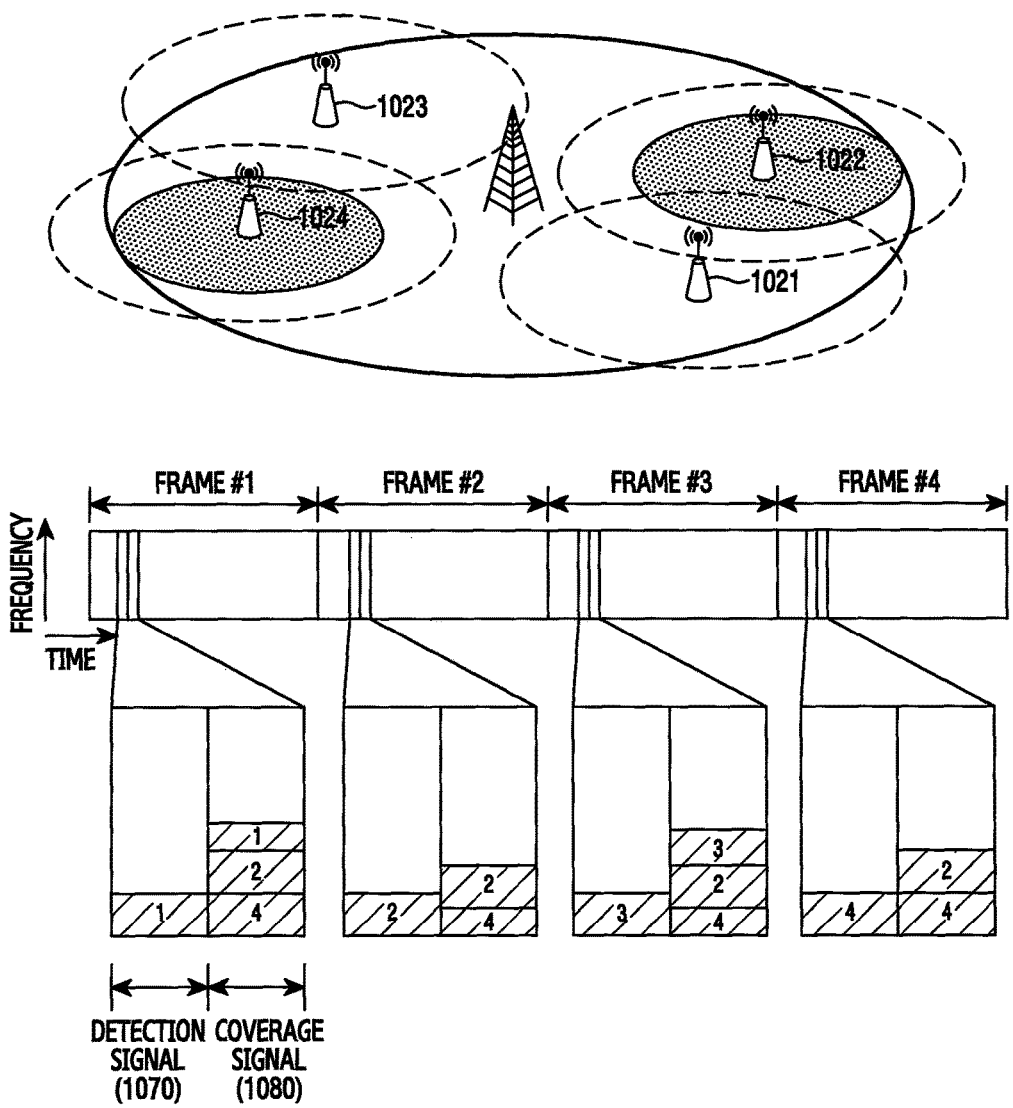
FIG. 10 illustrates another use example of a discovery channel in a wireless communication system according to an exemplary embodiment of the present disclosure.

A discovery channel use example of a case of partially puncturing the coverage signal is given as in FIG. 10 below. FIG. 10 illustrates another use example of a discovery channel in a wireless communication system according to an exemplary embodiment of the present disclosure. The FIG. 10 is a situation in which four small cells 1021 to 1024 are located adjacently, and exemplifies a case where a small cell base station#2 1022 and a small cell base station#4 1024 are in an active state, and a small cell base station#1 1021 and a small cell base station#3 1023 are in a dormant state. In the FIG. 10, a solid line represents the coverage of a coverage signal 1080, and a dotted line the coverage of a detection signal 1070. In the FIG. 10, a frequency-axis width of the coverage signal 1080 indicates the number of tones configuring for the coverage signal 1080, in other words, tones not punctured.

Referring to the FIG. 10, in a frame#1, the small cell base station#1 1021 transmits a detection signal 1070. And, in the frame#1, the small cell base station#1 1021, the small cell base station#2 1022, and the small cell base station#4 1024 transmit coverage signals 1080. The small cell base station#2 1022 and the small cell base station#4 1024 are in the active state and therefore, transmit the coverage signals 1080. The small cell base station#1 1021 is in the dormant state but a transmission period of the detection signal 1070 has arrived and therefore, it transmits the coverage signal 1080 together with the detection signal 1070. At this time, because the small cell base station#1 1021 is in the dormant state, a load level of the small cell base station#1 1021 is lower than those of the small cell base station#2 1022 and the small cell base station#4 1024. Accordingly to this, tones of a greater number in the coverage signal 1080 of the small cell base station#1 1021 are punctured.

In a frame#2, the small cell base station#2 1022 transmits a detection signal 1070. And, in the frame#2, the small cell base station#2 1022 and the small cell base station#4 1024 transmit coverage signals 1080. The small cell base station#2 1022 and the small cell base station#4 1024 are in the active state and therefore, transmit the coverage signals 1080. At this time, a load level of the small cell base station#4 1024 becomes lower than in the frame#1 and, accordingly to this, tones of a greater number in the coverage signal 1080 of the small cell base station#4 1024 are punctured.

In a frame#3, the small cell base station#3 1023 transmits a detection signal 1070. And, in the frame#3, the small cell base station#2 1022, the small cell base station#3 1023, and the small cell base station#4 1024 transmit coverage signals 1080. The small cell base station#2 1022 and the small cell base station#4 1024 are in the active state and therefore, transmit the coverage signals 1080. The small cell base station#3 1023 is in the dormant state but a transmission period of the detection signal 1070 has arrived and therefore, it transmits the coverage signal 1080 together with the detection signal 1070. At this time, because the small cell base station#3 1023 is in the dormant state, a load level of the small cell base station#3 1023 is lower than that of the small cell base station#2 1022. Accordingly to this, tones of a greater number in the coverage signal 1080 of the small cell base station#3 1023 are punctured.

In a frame#4, the small cell base station#4 1024 transmits a detection signal 1070. And, in the frame#4, the small cell base station#2 1022 and the small cell base station#4 1024 transmit coverage signals 1080. The small cell base station#2 1022 and the small cell base station#4 1024 are in the active state and therefore, transmit the coverage signals 1080. At this time, a load level of the small cell base station#4 1024 becomes higher than in the frame#3 and, accordingly to this, tones of a less number in the coverage signal 1080 of the small cell base station#4 1024 are punctured.

In the exemplary embodiment illustrated in the FIG. 10, the detection signal 1070 and the coverage signal 1080 are multiplexed within one frame. But, in accordance with another exemplary embodiment of the present disclosure, the detection signal 1070 and the coverage signal 1080 may be multiplexed on a basis of a frame or subframe. In this case, a frame forwarding the detection signal 1070 and a frame forwarding the coverage signal 1080 may be tied as one pair, and be used similarly with a scheme such as the FIG. 10.

In the exemplary embodiment illustrated in the FIG. 10, the detection signal 1070 and the coverage signal 1080 are multiplexed at a time axis. But, in accordance with another exemplary embodiment of the present disclosure, the detection signal 1070 and the coverage signal 1080 may be multiplexed at a frequency axis, or be multiplexed at another resource domain not the time axis or the frequency axis.

In the exemplary embodiment illustrated in the FIG. 10, the small cell partially punctures tones of a coverage signal, thereby being capable of informing a load degree. But, in accordance with another exemplary embodiment of the present disclosure, the small cell controls a transmission power of the coverage signal, thereby being capable of informing the load degree. In a concrete example, in case where the load level is equal to or is greater than 80%, the coverage signal may be transmitted using increased power allocated to the coverage signal. In case where the load level is 30% to 80%, the coverage signal may be transmitted using 50% of power allocated to the coverage signal. In case where the load level is less than 30%, the coverage signal may be transmitted using 30% of the power allocated to the coverage signal.

As described above, a discovery channel according to an exemplary embodiment of the present disclosure forwards a detection signal and a coverage signal. Also, the coverage of the detection signal and the coverage of the coverage signal are different. Accordingly, in accordance with a position of a moving terminal, the terminal cannot receive all of the detection signal and the coverage signal, or can receive the detection signal, or can receive all of the detection signal and the coverage signal.

Accordingly to this, a terminal according to an exemplary embodiment of the present disclosure may change a scheme of measurement of a discovery signal in accordance with a reception situation of the discovery signal. Here, the measurement procedure may be defined by a measurement period and a measurement parameter. For example, the reception situation of the discovery signal may be divided into a first situation in which the detection signal and the coverage signal are not all received, a second situation in which the detection signal is received, and a third situation in which the detection signal and the coverage signal are all received. In this case, the terminal may apply measurement periods of types different from one another in accordance with each situation. The terminal compares a strength of a reception signal or a signal to interference and noise ratio (SINR) of the reception signal with a predefined threshold value, thereby being capable of determining the reception or non-reception of the discovery signal.

The reception situation of the discovery signal may be easily extended into a case where two or more small cells exist. For example, the reception situation of the discovery signal may be divided into a first situation in which the detection signals and the coverage signals of all small cells are not all received, a second situation in which the detection signals transmitted by one or more small cells are received but the coverage signals are not received from all the small cells, and a third situation in which the detection signals and the coverage signals transmitted by one or more small cells are all received. Even in case where two or more small cells exist, the terminal may apply measurement periods of types different from one another in accordance with each situation.

Figure 11:
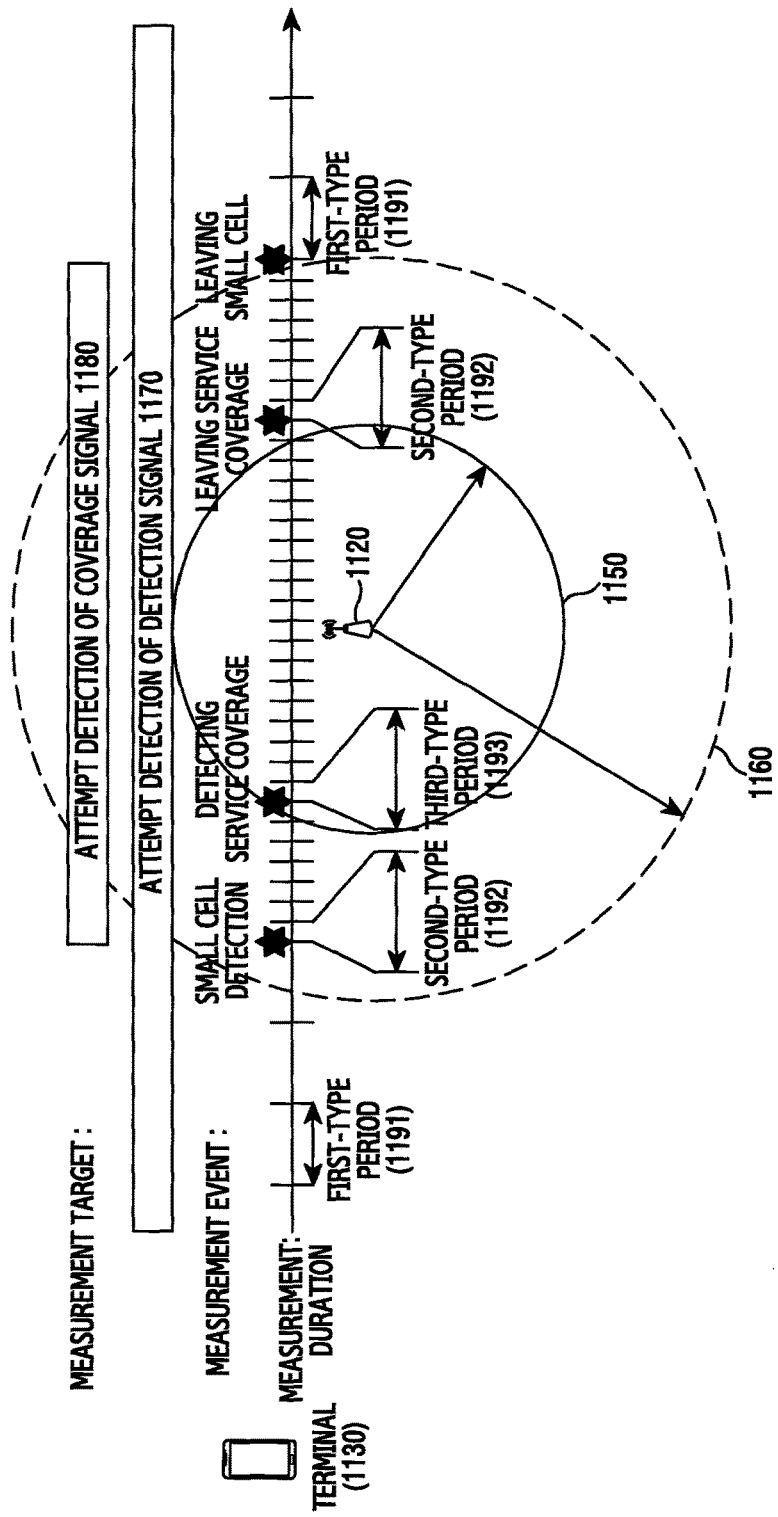
FIG. 11 illustrates an example of a measurement event result of a moving terminal in a wireless communication system according to an exemplary embodiment of the present disclosure.

An example of a measurement operation of controlling a measurement period in accordance with the situation is given as in FIG. 11 below. FIG. 11 illustrates an example of a measurement event result of a moving terminal in a wireless communication system according to an exemplary embodiment of the present disclosure. The FIG. 11 exemplifies measurement targets of a terminal passing through one small cell, measurement durations, and measurement events. In the FIG. 11, a dotted line circle represents the coverage of a detection signal, and a solid line circle the coverage of a coverage signal.

Referring to the FIG. 11, a terminal 1130 enters at the left side of a small cell 1120, and leaves at the right side. In case where the terminal 1130 is located outside the detection signal coverage of the small cell 1120, the terminal 1130 is in a first situation, in other words, a situation in which the terminal 1130 cannot receive all of the detection signal 1170 and the coverage signal 1180. In the first situation, the terminal 1130 applies a first-type period 1191. For example, the first-type period 1191 may be 1 sec. And, the terminal 1130 attempts the detection of the detection signal 1170. That is, the terminal 1130 attempts the detection of the detection signal 1170 by periods in accordance with the first-type period 1191.

Thereafter, if the terminal 1130 enters the coverage 1160 of the detection signal 1170 outside the coverage 1150 of the coverage signal 1180, the terminal 1130 is in a second situation, in other words, a situation in which the terminal 1130 can receive the detection signal 1170, and cannot the coverage signal 1180. In the second situation, after succeeding in the detection of the detection signal 1170 of the small cell 1120, the terminal 1130 applies a second-type period 1192. The second-type period 1192 may be shorter than the first-type period 1191. For example, the second-type period 1192 may be 200 msec. And, after succeeding in the detection of the detection signal 1170, the terminal 1130 attempts the detection of all of the detection signal 1170 and the coverage signal 1180. That is, the terminal 1130 attempts the detection of the detection signal 1170 and the coverage signal 1180 by periods in accordance with the second-type period 1192.

Thereafter, if the terminal 1130 enters the coverage 1150 of the coverage signal 1180, the terminal 1130 is in a third situation, in other words, a situation in which the terminal 1130 can receive all of the detection signal 1170 and the coverage signal 1180. In the third situation, after succeeding in the detection of the coverage signal 1180 of the small cell 1120, the terminal 1130 applies a third-type period 1193. The third-type period 1193 may be shorter than the first-type period 1191. For example, the third-type period 1193 may be 200 msec. And, after succeeding in the detection of the coverage signal 1180, the terminal 1130 attempts the detection of all of the detection signal 1170 and the coverage signal 1180. That is, the terminal 1130 attempts the detection of the detection signal 1170 and the coverage signal 1180 by periods in accordance with the third-type period 1193.

Thereafter, if the terminal 1130 leaves the coverage 1150 of the coverage signal 1180, the terminal 1130 is in the second situation, in other words, the situation in which the terminal 1130 can receive the detection signal 1170 and loses the coverage signal 1180. In the second situation, by failing in the detection of the coverage signal 1180 of the small cell 1120, the terminal 1130 determines the leaving of service coverage. Accordingly to this, the terminal 1130 applies the second-type period 1192, and attempts the detection of all of the detection signal 1170 and the coverage signal 1180.

Thereafter, if the terminal 1130 leaves the coverage 1160 of the detection signal 1170, the terminal 1130 is in the first situation, in other words, the situation in which the terminal 1130 cannot receive the detection signal 1170 and the coverage signal 1180. In the first situation, by failing in the detection of the coverage signal 1170 of the small cell 1120, the terminal 1130 determines the leaving of the coverage 1160 of the detection signal 1170 of the small cell 1120. Accordingly to this, the terminal 1130 applies the first-type period 1192, and attempts the detection of the detection signal 1170. In other words, the terminal 1130 suspends attempting the detection of the coverage signal 1180.

The exemplary embodiment described with reference to the FIG. 11 is the exemplification of a case where the terminal 1130 passes through the coverage of the coverage signal 1180. But, a measurement procedure different from the example of the FIG. 11 may be performed according to a movement trajectory not passing through the coverage of the coverage signal 1180, etc.

In the case of the exemplary embodiment of the FIG. 11, the first-type period 1191, the second-type period 1192, and/or the third-type period 1193 are selectively applied in accordance with the first situation, the second situation, and/or the third situation. But, in accordance with various exemplary embodiments of the present disclosure, each of measurement procedures having the first-type period 1191, the second-type period 1192, and the third-type period 1193 may be performed in one or more situations among the first situation, the second situation, and the third situation. In this case, the terminal 1130 may perform a measurement procedure that is based on a plurality of periods in each situation.

Figure 12:
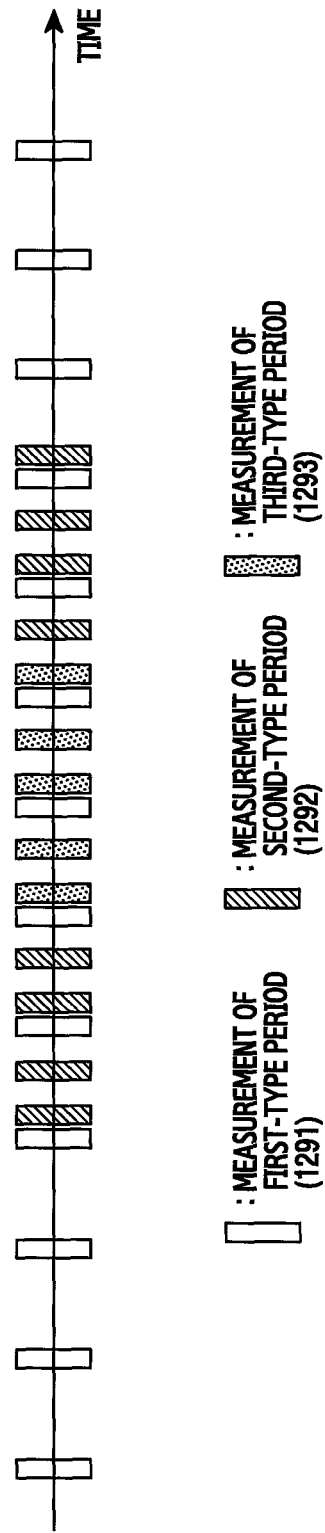
FIG. 12 illustrates another example of a measurement event result of a moving terminal in a wireless communication system according to an exemplary embodiment of the present disclosure.

In accordance with another exemplary embodiment of the present disclosure, the first-type period 1191 and the measurement procedure corresponding to the first-type period 1191 may be used all the time regardless of a measurement result of a discovery signal. For example, the measurement procedure may be performed as in FIG. 12 below. FIG. 12 illustrates another example of a measurement event result of a moving terminal in a wireless communication system according to an exemplary embodiment of the present disclosure. Referring to the FIG. 12, a measurement procedure 1291 corresponding to a first-type period is performed in accordance with the first-type period. At this time, even if a measurement procedure 1292 corresponding to a second-type period and a measurement period 1293 corresponding to a third-type period are carried out in the second situation and the third situation, the measurement procedure 1291 corresponding to the first-type period may be kept being performed for the sake of measurement of the discovery signal and other reference signals.

Figure 13:
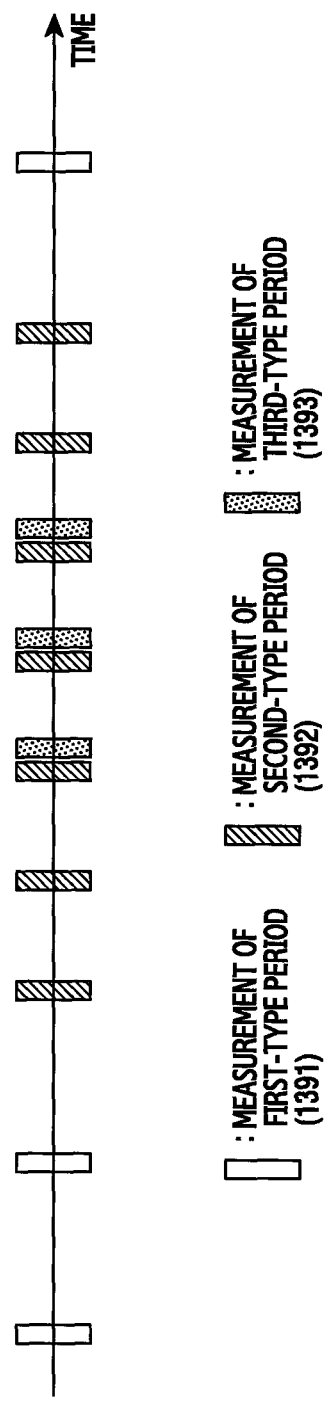
FIG. 13 illustrates a further example of a measurement event result of a moving terminal in a wireless communication system according to an exemplary embodiment of the present disclosure.

In accordance with another exemplary embodiment of the present disclosure, the second-type period 1192 and the measurement procedure corresponding to the second-type period 1192 may be used even besides the second situation. For example, the measurement procedure may be performed as in FIG. 13 below. FIG. 13 illustrates a further example of a measurement event result of a moving terminal in a wireless communication system according to an exemplary embodiment of the present disclosure. Referring to the FIG. 13, a measurement procedure 1392 corresponding to a second-type period is performed after a measurement procedure 1391 corresponding to a first-type period. At this time, the measurement procedure 1392 corresponding to the second-type period may be used for the sake of measurement of a discovery signal or other reference signals in a situation in which a detection signal is received and, further, may be used for the sake of the measurement of the discovery signal and the other reference signals even in the third situation. That is, as illustrated in the FIG. 13, even while the measurement procedure 1393 corresponding to the third-type period is performed, the measurement procedure 1392 corresponding to the second-type period may be kept being performed.

In accordance with another exemplary embodiment of the present disclosure, unlike the FIG. 13, the measurement procedure 1391 corresponding to the first-type period, the measurement procedure 1392 corresponding to the second-type period, and the measurement procedure 1393 corresponding to the third-type period may be performed concurrently.

In accordance with another exemplary embodiment of the present disclosure, the third-type period 1193 and the measurement procedure corresponding to the third-type period 1193 may be used for the sake of the measurement of the discovery signal or the other reference signals in a situation in which the coverage signal is detected or the third situation in which the reception performance of the coverage signal is equal to or is greater than a specific value.

Figure 14:
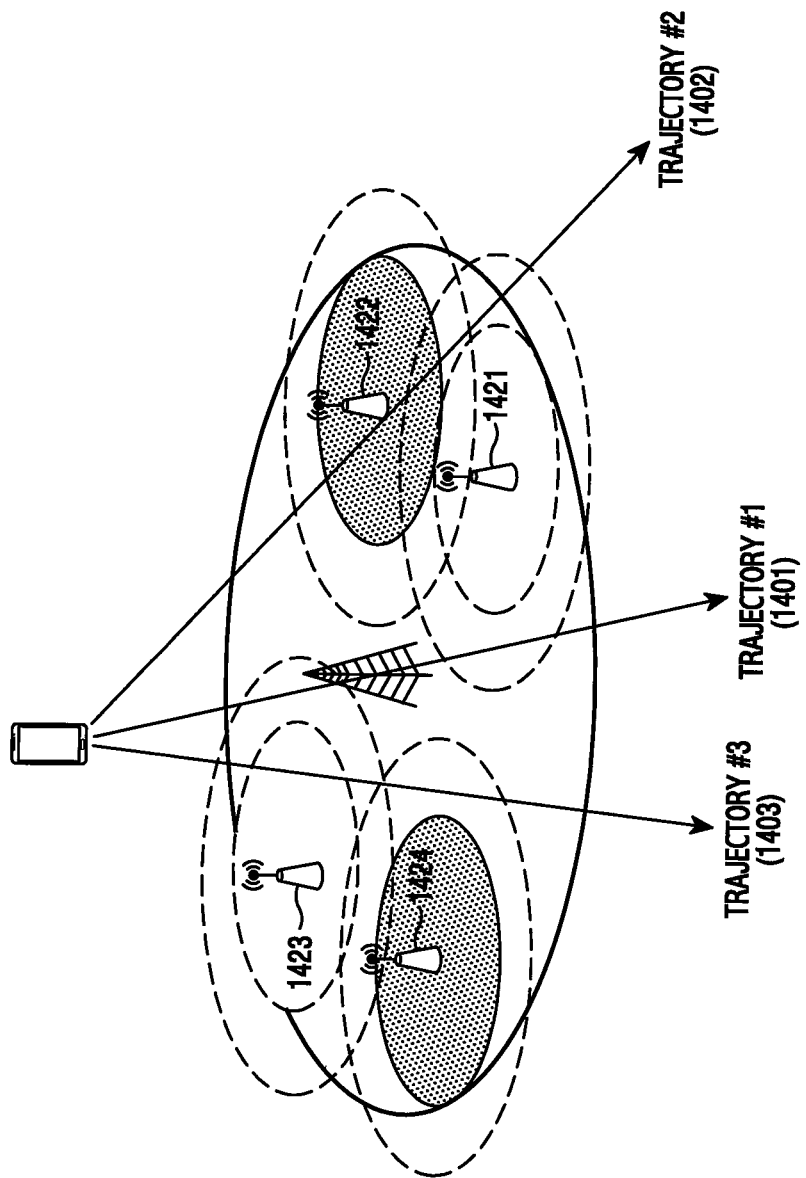
FIG. 14 illustrates examples of movement trajectories of a terminal in a wireless communication system according to an exemplary embodiment of the present disclosure.

FIG. 14 illustrates examples of movement trajectories of a terminal in a wireless communication system according to an exemplary embodiment of the present disclosure. The FIG. 14 is a situation in which four small cells 1421 to 1424 are located adjacently, and exemplifies a case where the small cell#2 1422 and the small cell#4 1424 are in an active state, and the small cell#1 1421 and the small cell#3 1423 in a dormant state. In the FIG. 14, a solid line represents the coverage of a coverage signal, and a dotted line the coverage of a detection signal.

Referring to a trajectory#1 1401, a terminal passes through the detection signal coverage of the small cell#3 1423, and the detection signal coverage of the small cell#1 1421. Accordingly to this, the terminal is, as time flows, placed in a first situation, a second situation, first situation in the small cell#3 1423, and a second situation, first situation in the small cell#1 1421.

Referring to a trajectory#2 1402, a terminal passes through the detection signal coverage of the small cell#2 1422, the coverage signal coverage of the small cell#2 1422, and the detection signal coverage of the small cell#1 1421. Accordingly to this, the terminal is, as time flows, placed in a first situation, a second situation in the small cell#2 1422, a third situation in the small cell#2 1422, a second situation in the small cell#2 1422, and a second situation, first situation in the small cell#1 1421.

Referring to a trajectory#3 1403, a terminal passes through the detection signal coverage of the small cell#3 1423, the coverage signal coverage of the small cell#3 1423, and the detection signal coverage of the small cell#4 1424. Accordingly to this, the terminal is, as time flows, placed in a first situation, a second situation in the small cell#3 1423, a third situation in the small cell#3 1423, a second situation, first situation in the small cell#3 1423, and a second situation, first situation in the small cell#4 1424.

With reference to the drawings below, the present disclosure describes operations and constructions of a terminal, a macro base station, and a small cell base station for performing small cell measurement as described above.

Figure 15:
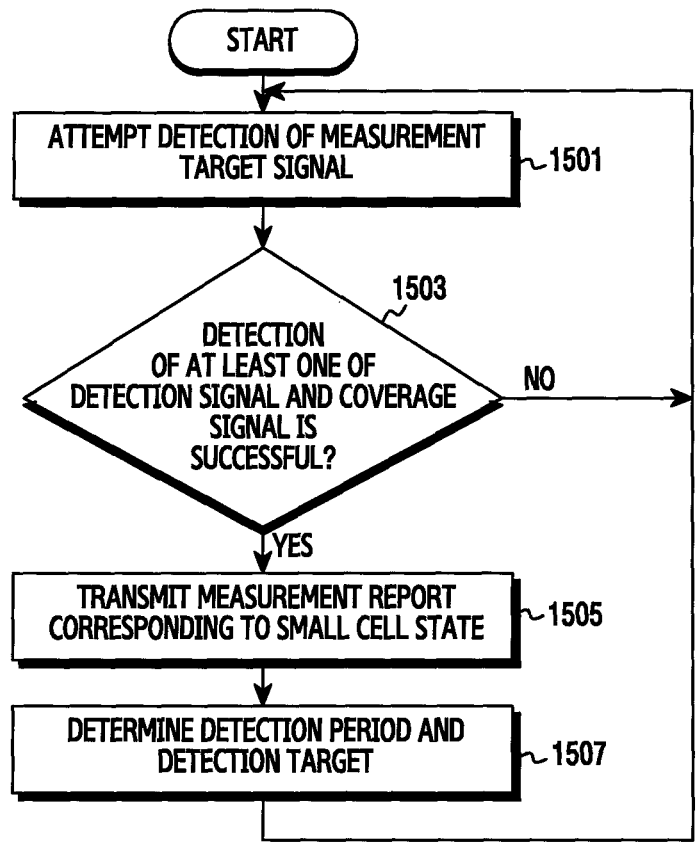
FIG. 15 illustrates an operation procedure of a terminal in a wireless communication system according to an exemplary embodiment of the present disclosure.

FIG. 15 illustrates an operation procedure of a terminal in a wireless communication system according to an exemplary embodiment of the present disclosure.

Referring to the FIG. 15, in step 1501, the terminal attempts the detection of a measurement target signal. The measurement target signal varies according to the type (e.g., a detection signal, a coverage signal) of a currently received, in other words, currently detectable discovery signal. For example, in case where the terminal cannot detect all of the detection signal and the coverage signal, the measurement target includes the detection signal. For another example, in case where the terminal can detect the detection signal, the measurement target includes the detection signal and the coverage signal. For further example, in case where the terminal can detect all of the detection signal and the coverage signal, the measurement target includes the detection signal and the coverage signal.

A period and measurement parameter in which the terminal measures the target signal in the step 1501 varies according to the type (e.g., a detection signal, a coverage signal) of a currently detectable discovery signal. For example, the terminal may apply measurement periods and measurement parameters of types different from one another in accordance with a first situation in which the detection signals and the coverage signals of all small cells are not all received, a second situation in which the detection signals that one or more small cells transmit are received but the coverage signals are not received from all the small cells, and/or a third situation in which the detection signals and the coverage signals that one or more small cells transmit are all received. However, in accordance with various exemplary embodiments of the present disclosure, the terminal may apply all of measurement periods and measurement parameters of types different from one another for the situations different from one another. That is, the terminal may apply the measurement periods and measurement parameters defined by situation, to other situations as well. In other words, the terminal may independently perform a plurality of measurement procedures that are defined for each situation.

After the detection attempt, the terminal proceeds to step 1503 and determines if it succeeded in the detection of at least one of the detection signal and the coverage signal. Here, a scheme of determination of the detection success or non-success may vary according to structures of the detection signal and the coverage signal. For example, the detection signal and the coverage signal may be configured by a predefined sequence such as a synchronization signal, or be configured to be transmitted together with data symbols through some tones. For example, the terminal performs correlation operation, thereby being capable of determining the detection success or failure. Also, the terminal may determine the reception or non-reception of the detection signal and the coverage signal by comparing a strength of a reception signal or a signal to interference and noise ratio (SINR) of the reception signal with a predefined threshold value. If the detection signal and the coverage signal are not all detected, the terminal returns to the step 1501 with maintaining the measurement target. Thereafter, the detection attempt in the step 1501 is performed after the lapse of a predefined period.

If at least one of the detection signal and the coverage signal is detected, the terminal proceeds to step 1505 and transmits an MR (Measurement Report) corresponding to the small cell state. The measurement report may include information about at least one of the type of a detected signal, the type of a lost signal, identification information of a small cell transmitting the detected signal, an operation state (e.g., an active state, a dormant state) of the small cell, and/or a channel quality determined based on the detected signal. That is, the terminal checks identification information of a corresponding small cell, and/or an operation state of the corresponding small cell through detected at least one of the detection signal and the coverage signal, and transmits the measurement report. At this time, the terminal may transmit the report to a macro base station or the small cell base station. In case where a small cell in which a discovery signal is detected is in a dormant state, and a detection signal of the small cell is detected and a coverage signal is not detected, the terminal may not report a measurement report on the small cell. Through this, it may be prevented that the small cell of the dormant state is unnecessarily woken-up in the active state. Also, in case where a small cell in which a discovery signal is detected is in an active state, and a detection signal of the small cell is detected and a coverage signal is not detected, the terminal may not report a measurement report on the small cell. Through this, it reduces the number of times in which the terminal reports a measurement result, being able to prevent the excessive power consumption of the terminal.

After transmitting the measurement report, the terminal proceeds to step 1507 and determines the measurement period, the measurement parameter and the measurement target. The measurement period, the measurement parameter and the measurement target are determined based on the type of a current received, in other words, currently detectable discovery signal. Accordingly to this, if the type of the detectable discovery signal is changed, the measurement period, the measurement parameter and the measurement target may be changed. For example, in case where the terminal cannot detect all of the detection signal and the coverage signal, the measurement target includes the detection signal. For another example, in case where the terminal can detect the detection signal, the measurement target includes the detection signal and the coverage signal. For further example, in case where the terminal can detect all of the detection signal and the coverage signal, the measurement target includes the detection signal and the coverage signal. Also, a first measurement period of a case where the detection signal and the coverage signal are not all detected may be longer than a second measurement period of a case where the detection signal is detected and a third measurement period of a case where the detection signal and the coverage signal are all detected. However, in accordance with various exemplary embodiments of the present disclosure, two or more among a measurement procedure corresponding to the first measurement period, a measurement procedure corresponding to the second measurement period, and/or a measurement procedure corresponding to the third measurement period may be carried out in parallel.

In the exemplary embodiment illustrated in the FIG. 15, if at least one discovery signal is detected, the terminal transmits a measurement report. But, in accordance with another exemplary embodiment of the present disclosure, even though at least one discovery signal is detected, the terminal may not transmit a measurement report. For example, in case where at least one of the detection signal and the coverage signal is repeatedly detected every measurement period, while the detection is maintained, the terminal may not retransmit the measurement report. That is, the terminal may transmit the measurement report in case where at least one of the detection signal and the coverage signal is additionally detected or is additionally lost.

Figure 16:
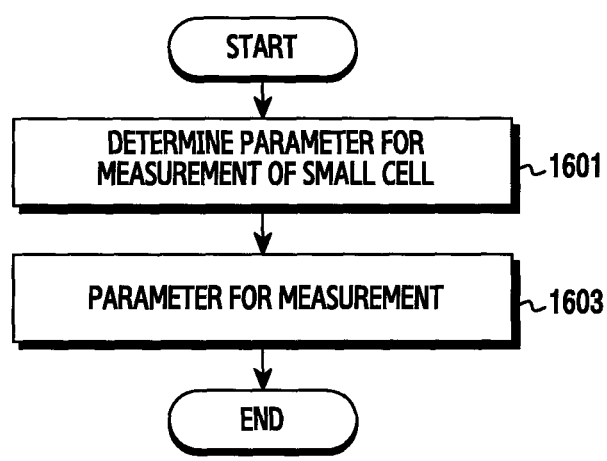
FIG. 16 illustrates an operation procedure of a macro base station in a wireless communication system according to an exemplary embodiment of the present disclosure.

FIG. 16 illustrates an operation procedure of a macro base station in a wireless communication system according to an exemplary embodiment of the present disclosure.

Referring to the FIG. 16, in step 1601, the macro base station determines parameters for measurement on at least one small cell. The parameters may include at least one of a measurement period by situation, discovery channel allocation information, a transmission period of a discovery signal by small cell base station, an information item included in a measurement report, and/or a time point (e.g., detection signal detecting, coverage signal detecting, coverage signal loss, detection signal loss) at which the measurement report is transmitted.

Thereafter, the macro base station proceeds to step 1603 and transmits the determined parameters. At this time, some of the parameters may be transmitted to a small cell base station, and some to a terminal. For example, the macro base station may provide small cell base stations within a macro cell with the discovery channel allocation information and/or the transmission period of the discovery signal by small cell base station. Also, the macro base station may transmit, to terminals with a macro cell, the measurement period by situation, the discovery channel allocation information, the transmission period of the discovery signal by small cell base station, the information item included in the measurement report, and/or the time point at which the measurement report is transmitted, etc. Here, the macro base station may transmit the parameters to the terminals through a broadcasting channel or unicast message.

Figure 17:
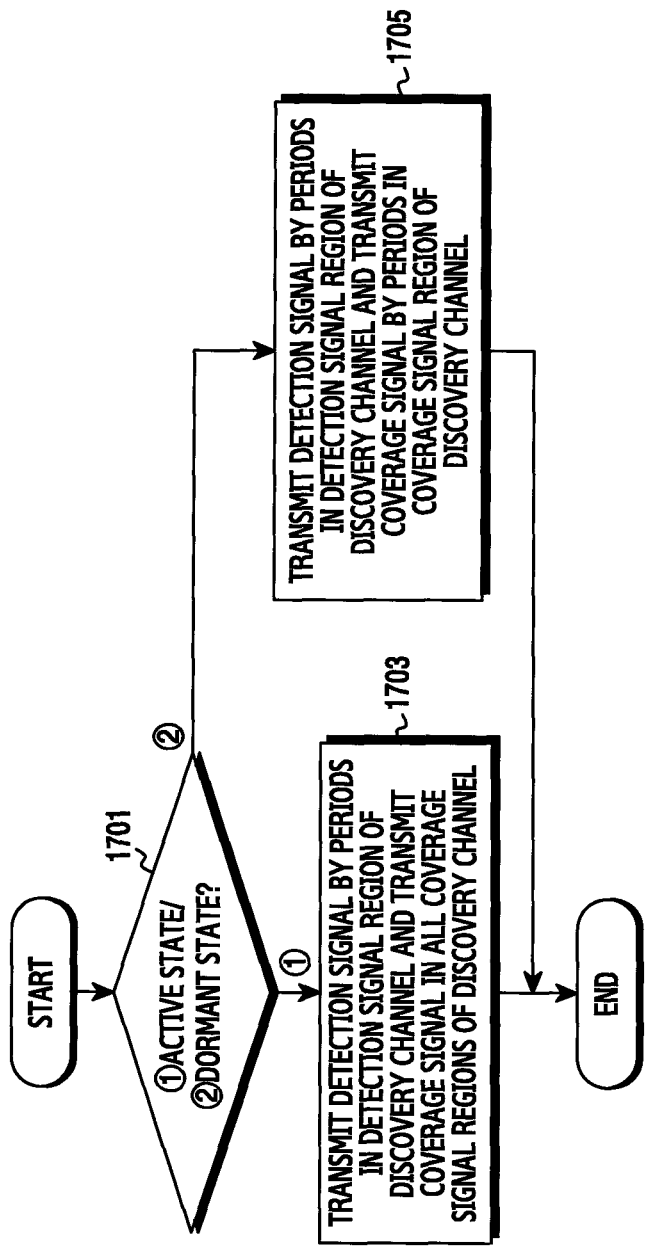
FIG. 17 illustrates an operation procedure of a small cell base station in a wireless communication system according to an exemplary embodiment of the present disclosure.

FIG. 17 illustrates an operation procedure of a small cell base station in a wireless communication system according to an exemplary embodiment of the present disclosure.

Referring to the FIG. 17, in step 1701, the small cell base station determines an operation state. The operation state is one of an active state and a dormant state. The activate state, a situation in which at least one terminal is connected to a small cell, means a state in which the small cell performs communication. The dormant state, a situation in which a terminal connected to the small cell does not exist, means a state in which the small cell does not perform communication with the terminal.

If the small cell base station is in the active state, the small cell base station proceeds to step 1703 and transmits a detection signal by periods in a detection signal region of a discovery channel, and transmits coverage signals in all coverage signal regions of the discovery channel. That is, the small cell base station continuously transmits the coverage signal. And, the small cell base station periodically transmits the detection signal. Here, a transmission period of the detection signal may be instructed from a macro base station, or be instructed from a separate control node. The detection signal is scheduled to be transmitted exclusively between a plurality of small cell base stations. In accordance with an exemplary embodiment of the present disclosure, some tones of the coverage signal may be punctured in accordance with a load level of the small cell base station. Also, a transmission power of the coverage signal may be set in accordance with the load level of the small cell base station.

If the small cell base station is in the dormant state, the small cell base station proceeds to step 1705 and transmits the detection signal by periods in a detection signal region of a discovery channel, and transmits the coverage signal by periods in a coverage signal region of the discovery channel. The detection signal is scheduled to be transmitted exclusively between a plurality of small cell base stations. At this time, a transmission period of the detection signal and a transmission period of the coverage signal are the same, and the coverage signal is transmitted through the coverage signal region that is paired with the detection signal region in which the detection signal is transmitted. For example, in case where the detection signal region and the coverage signal region are allocated in one frame as in the FIG. 5, the small cell base station may transmit the coverage signal in a frame at which the detection signal is transmitted. Here, transmission periods of the detection signal and coverage signal may be instructed from the macro base station, or be instructed from a separate control node.

Figure 18:
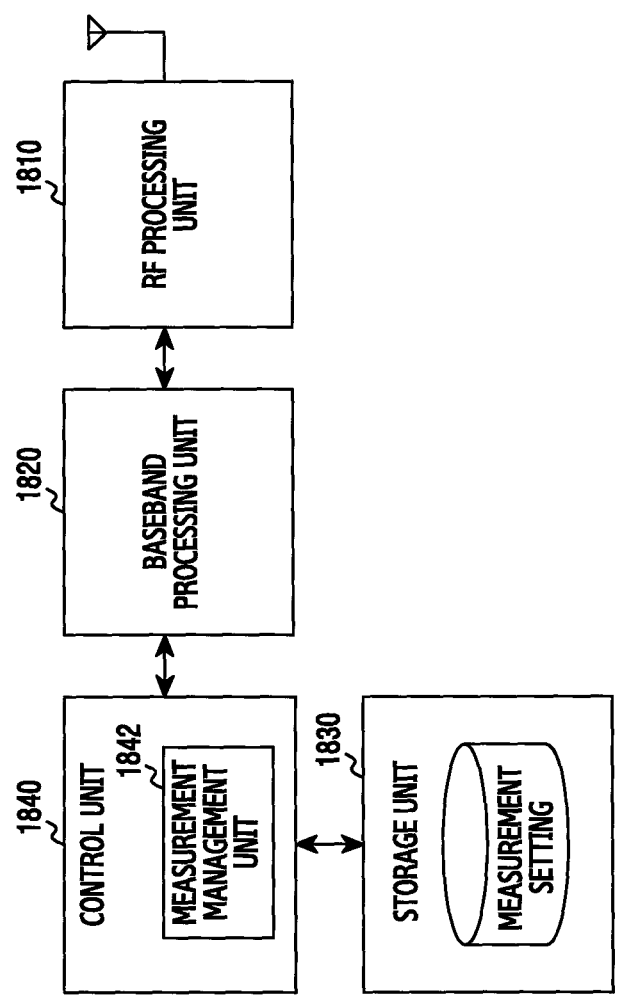
FIG. 18 illustrates a block construction of a terminal in a wireless communication system according to an exemplary embodiment of the present disclosure.

FIG. 18 illustrates a block construction of a terminal in a wireless communication system according to an exemplary embodiment of the present disclosure.

Referring to the FIG. 18, the terminal includes an RF (Radio Frequency) processing unit 1810, a baseband processing unit 1820, a storage unit 1830, and a control unit 1840.

The RF processing unit 1810 performs a function for transceiving a signal through a wireless channel such as signal band translation, amplification, etc. That is, the RF processing unit 1810 up converts, into an RF band signal, a baseband signal provided from the baseband processing unit 1820 and then transmits through an antenna, and down converts, into a baseband signal, an RF band signal received through the antenna. For example, the RF processing unit 1810 may include a transmission filter, a reception filter, an amplifier, a mixer, an oscillator, a DAC (Digital to Analog Converter), an ADC (Analog to Digital Converter), etc. In the FIG. 18, one antenna is illustrated, but the terminal may have a plurality of antennas. Also, the RF processing unit 1810 may include a plurality of RF chains.

The baseband processing unit 1820 performs a function of conversion between a baseband signal and a bit stream in compliance with a physical layer standard of a system. For example, at data transmission, the baseband processing unit 1820 encodes and modulates a transmission bit stream, thereby generating complex symbols. Also, at data reception, the baseband processing unit 1820 restores a reception bit stream through demodulating and decoding a baseband signal provided from the RF processing unit 1810. For example, in the case of following an OFDM scheme, at data transmission, the baseband processing unit 1820 encodes and modulates a transmission bit stream, thereby generating complex symbols, and maps the complex symbols to sub-carriers and then, constructs OFDM symbols through IFFT (Inverse Fast Fourier Transform) operation and CP (Cyclic Prefix) insertion. Also, at data reception, the baseband processing unit 1820 divides a baseband signal provided from the RF processing unit 1810 in the unit of OFDM symbol, and restores signals mapped to subcarriers through FFT (Fast Fourier Transform) operation and then, restores a reception bit stream through demodulation and decoding. The baseband processing unit 1820 and the RF processing unit 1810 transmits and receives a signal as described above. Accordingly to this, the baseband processing unit 1820 and the RF processing unit 1810 may be named a transmission unit, a reception unit, or a transceiving unit.

The storage unit 1830 stores data of a basic program for an operation of the terminal, an application program, setting information, etc. For example, the storage unit 1830 may store setting parameters used to measure a small cell. And, the storage unit 1830 provides stored data in accordance with a request of the control unit 1840.

The control unit 1840 controls general operations of the terminal. For example, the control unit 1840 transceiver a signal through the baseband processing unit 1820 and the RF processing unit 1810. In accordance with an exemplary embodiment of the present disclosure, the control unit 1840 includes a measurement management unit 1842 controlling functions for discovering a small cell. For example, the control unit 1840 controls the terminal to perform the procedure illustrated in the FIG. 15. An operation of the control unit 1840 according to an exemplary embodiment of the present disclosure is given as follows.

In accordance with an exemplary embodiment of the present disclosure, the control unit 1840 attempts the detection of a measurement target signal. The measurement target signal varies according to the type (e.g., a detection signal, a coverage signal) of a currently received, in other words, currently detectable discovery signal. The detection signal and the coverage signal may be configured by a predefined sequence such as a synchronization signal, or be configured to be transmitted through some tones together with data symbols.

If at least one of the detection signal and the coverage signal is detected, the control unit 1840 generates a measurement report corresponding to the small cell state, and transmits the measurement report through the baseband processing unit 1820 and the RF processing unit 1810. For example, the control unit 1840 may transmit the measurement report in case where at least one of the detection signal and the coverage signal is additionally detected or is additionally lost. The measurement report may include information about at least one of the type of a detected signal, the type of a lost signal, identification information of a small cell transmitting the detected signal, and/or an operation state (e.g., an active state, a dormant state) of the small cell. At this time, the control unit 1840 may transmit the report to a macro base station or the small cell base station. And, the control unit 1840 determines the measurement period and the measurement target based on the type of a currently detectable discovery signal. However, in accordance with various exemplary embodiments of the present disclosure, two or more among a measurement procedure corresponding to the first measurement period, a measurement procedure corresponding to the second measurement period, and/or a measurement procedure corresponding to the third measurement period may be carried out in parallel.

Figure 19:
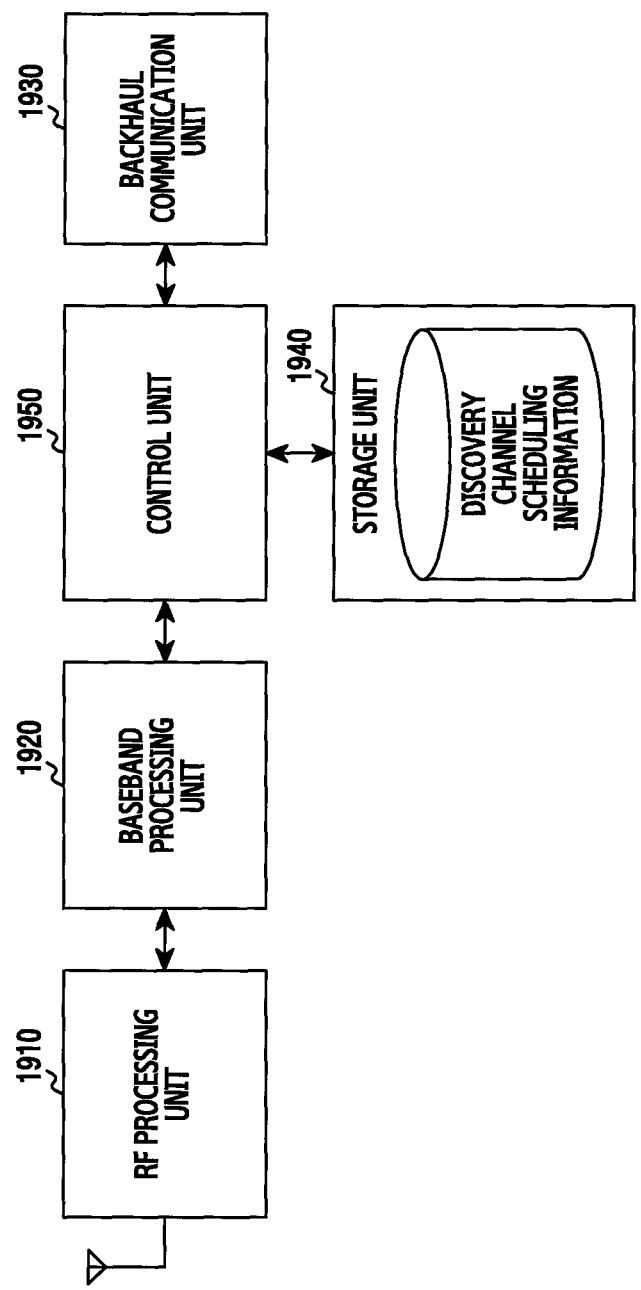
FIG. 19 illustrates a block construction of a base station in a wireless communication system according to an exemplary embodiment of the present disclosure.

FIG. 19 illustrates a block construction of a base station in a wireless communication system according to an exemplary embodiment of the present disclosure. A construction of the base station illustrated in the FIG. 19 may be applied to a macro base station or a small cell base station.

As illustrated in the FIG. 19, the base station includes an RF processing unit 1910, a baseband processing unit 1920, a backhaul communication unit 1930, a storage unit 1940, and a control unit 1950.

The RF processing unit 1910 performs a function for transceiving a signal through a wireless channel such as signal band translation, amplification, etc. That is, the RF processing unit 1910 up converts, into an RF band signal, a baseband signal provided from the baseband processing unit 1920 and then transmits through an antenna, and down converts, into a baseband signal, an RF band signal received through the antenna. In the FIG. 19, one antenna is illustrated, but the base station may have a plurality of antennas. The RF processing unit 1910 includes RF chains for each of a plurality of antennas, and each RF chain may include a transmission filter, a reception filter, an amplifier, a mixer, an oscillator, a DAC, an ADC, etc.

The baseband processing unit 1920 performs a function of conversion between a baseband signal and a bit stream in compliance with a physical layer standard of a system. For example, in the case of following an OFDM scheme, at data transmission, the baseband processing unit 1920 encodes and modulates a transmission bit stream, thereby generating complex symbols, and maps the complex symbols to subcarriers and then, constructs OFDM symbols through IFFT operation and CP insertion. Also, at data reception, the baseband processing unit 1920 divides a baseband signal provided from the RF processing unit 1910 in the unit of OFDM symbol, and restores signals mapped to subcarriers through FFT operation and then, restores a reception bit stream through demodulating and decoding. The baseband processing unit 1920 and the RF processing unit 1910 transmit and receive a signal as described above. Accordingly to this, the baseband processing unit 1920 and the RF processing unit 1910 may be named a transmission unit, a reception unit, or a transceiving unit.

The backhaul communication unit 1930 provides an interface for performing communication with other nodes within a network. That is, the backhaul communication unit 1930 converts, into a physical signal, a bit stream transmitted from the base station to another node, for example, another base station, a core network, etc., and converts, into a bit stream, a physical signal received from the another node.

The storage unit 1940 stores data of a basic program for an operation of the base station, an application program, setting information, etc. For example, the storage unit 1940 may store scheduling information about a discovery channel. And, the storage unit 1940 provides stored data in accordance with a request of the control unit 1950.

The control unit 1950 controls general operations of the base station. For example, the control unit 1940 transceives a signal through the baseband processing unit 1920 and the RF processing unit 1910 or through the backhaul communication unit 1930. Also, the control unit 1940 records data in the storage unit 1940, and reads. In accordance with an exemplary embodiment of the present disclosure, the control unit 1950 controls the base station to perform the procedure illustrated in the FIG. 16 or the FIG. 19. An operation of the control unit 1940 according to an exemplary embodiment of the present disclosure is given as follows.

In case where the base station is a macro base station, the control unit 1950 determines parameters for measurement on at least one small cell. The parameters may include at least one of a measurement period by situation, discovery channel allocation information, a transmission period of a discovery signal by small cell base station, an information item included in the measurement report, and/or a time point (e.g., detection signal detecting, coverage signal detecting, coverage signal loss, detection signal loss) at which the measurement report is transmitted. And, the control unit 1950 controls to provide the determined parameters to terminals within a macro cell and small cell base stations.

In case where the base station is a small cell base station and is in an active state, the control unit 1950 controls to transmit a detection signal by periods in a detection signal region of a discovery channel, and transmit coverage signals in all coverage signal regions of the discovery channel. At this time, in accordance with one exemplary embodiment of the present disclosure, some tones of the coverage signal may be punctured in accordance with a load level of the small cell base station. Also, a transmission power of the coverage signal may be set in accordance with the load level of the small cell base station.

In case where the base station is a small cell base station and is in a dormant state, the control unit 1950 controls to transmit the detection signal by periods in a detection signal region of a discovery channel, and transmit the coverage signal by periods in a coverage signal region of the discovery channel. At this time, a transmission period of the detection signal and a transmission period of the coverage signal are the same, and the coverage signal is transmitted through the coverage region that is paired with the detection signal region in which the detection signal is transmitted.

Methods according to exemplary embodiments mentioned in claims of the present disclosure and/or a specification may be implemented in a form of hardware, software, or a combination of hardware and software.

In the case of implementing by software, a computer-readable storage medium storing one or more programs (software module) may be provided. The one or more programs stored in the computer-readable storage medium are configured for execution by one or more processors within an electronic device. The one or more programs may include instructions enabling the electronic device to execute the methods according to the exemplary embodiments mentioned in the claims of the present disclosure and/or the specification.

This program (software module, software) may be stored in a random access memory, a non-volatile memory including a flash memory, a ROM (Read Only Memory), an EEPROM (Electrically Erasable Programmable Read Only Memory), a magnetic disc storage device, a CD-ROM (Compact Disc-ROM), DVDs (Digital Versatile Discs) or an optical storage device of another form, a magnetic cassette. Or, it may be stored in a memory constructed by a combination of some of these or all. Also, each construction memory may be included in plural as well.

Also, the program may be stored in an attachable storage device that is accessible through a communication network such as the Internet, an intranet, a LAN (Local Area Network), a WLAN (Wireless LAN), or a SAN (Storage Area Network), or a communication network constructed by a combination of these. This storage device may connect to a device performing an exemplary embodiment of the present disclosure through an external port. Also, a separate storage device on a communication network may connect to a device performing an exemplary embodiment of the present disclosure as well.

In the aforementioned concrete exemplary embodiments of the present disclosure, components included in the disclosure have been expressed by the singular number or the plural number in accordance to a proposed concrete exemplary embodiment. But, the expression of the singular number or plural number is selected suitable to a proposed situation for description convenience, and the present disclosure is not limited to singular or plural components, and despite a component expressed by the plural number, it may be constructed by the singular number, or despite a component expressed by the singular number, it may be constructed by the plural number.

While a concrete exemplary embodiment has been described in a detailed description of the present disclosure, it is undoubted that various modifications are possible without departing from the scope of the present disclosure. Therefore, the scope of the present disclosure should not be limited and defined by the described exemplary embodiment and should be defined by not only the scope of claims described later but also equivalents to this scope of the claims.

What is claimed is:

1. A method for operating a terminal in a wireless communication system, the method comprising:
   receiving, from a base station, at least one of first signals that are used to detect an existence of a cell of the base station;
   receiving, from the base station, at least one of second signals that are used to detect a service coverage of the cell, after receiving the at least one of the first signals; and
   transmitting a measurement report for at least one of the first signals and the second signals,
   wherein the first signals are transmitted at a first time interval, and
   wherein the second signals are transmitted at a second time interval that is less than the first time interval.

2. The method of claim 1, further comprising:
   transmitting another measurement report informing that the at least one of the first signals is received, in response to receiving the at least one of first signals.

3. The method of claim 1, wherein the measurement report comprises information regarding at least one of a type of a received signal, a type of a lost signal, identification of the cell, an operation state of the cell, or a channel quality determined based on the received signal.

4. The method of claim 1, further comprising:
   determining to monitor the second signals, after receiving the at least one of the first signals.

5. The method of claim 1, further comprising:
   determining to monitor the first signals, before receiving the at least one of the first signals.

6. The method of claim 1, further comprising:
   if the first signals are not received after receiving the at least one of the first signals, transmitting another measurement report informing that the first signals are lost; and
   suspending monitoring the second signals.

7. The method of claim 1, further comprising:
   if the at least one of the second signals is received, monitoring the first signals and the second signals at a third time interval.

8. The method of claim 1, further comprising:
   after receiving the first signal, monitoring the first signals or reference signals at the first time interval.

9. A method for operating base station in a wireless communication system, the method comprising:
   transmitting first signals for informing existence of a cell of the base station; and
   transmitting second signals for informing a service coverage of the cell,
   wherein the first signals are transmitted at a first time interval, and
   wherein the second signals are transmitted at a second time interval that is less than the first time interval.

10. The method of claim 9, wherein the transmitting the second signals comprises, transmitting the second signals periodically in a dormant state.

11. The method of claim 9, wherein the transmitting the second signals comprises, transmitting the second signals through second signal regions of a discovery channel in an active state.

12. The method of claim 9, wherein the transmitting the second signals comprises, puncturing a part of resources allocated for the second signals based on a load level of the base station.

13. An apparatus for a terminal in a wireless communication system, the apparatus comprising:
   a transceiver; and
   at least one processor coupled to the transceiver and configured to:
      receive, from a base station, at least one of first signals informing that are used to detect an existence of a cell;
      receive, from the base station, at least one of second signals that are used to detect a service coverage of the cell, after receiving the at least one of the first signals; and
      transmit a measurement report for at least one of the first signals and the second signals,
   wherein the first signals are transmitted at a first time interval, and wherein the second signals are transmitted at a second time interval that is less than the first time interval.

14. The apparatus of claim 13, wherein the at least one processor is further configured to transmit another measurement report informing that the at least one of the first signals are received, in response to receiving the at least one of the first signals.

15. The apparatus of claim 13, wherein the at least one processor is further configured to determine to monitor the second signals, after receiving the at least one of the first signals.

16. The apparatus of claim 13, wherein the at least one processor is further configured to determine to monitor the first signals, before receiving the at least one of the first signals.

17. The apparatus of claim 13, wherein the at least one processor is further configured to, if the at least one of the second signals is received, monitor the first signals and the second signals at a third time interval.

18. The method of claim 1, wherein each of the second signals comprises at least one of information regarding identification of the cell and information regarding an operation state of the cell.

19. The method of claim 9, further comprising:
receiving, from a terminal receiving at least one of the first signals and the second signals, a measurement report for at least one of the first signals and the second signals,
wherein the measurement report comprises information regarding at least one of a type of a received signal, a type of a lost signal, identification of the cell, an operation state of the cell, or a channel quality determined based on the received signal.

20. The apparatus of claim 13, wherein each of the second signals comprises at least one of information regarding identification of the cell and information regarding an operation state of the cell.

* * * * *